(12) United States Patent
Matsushima

(10) Patent No.: US 11,886,080 B2
(45) Date of Patent: *Jan. 30, 2024

(54) LIQUID CRYSTAL DISPLAY

(71) Applicant: Japan Display Inc., Tokyo (JP)

(72) Inventor: Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,027

(22) Filed: Mar. 28, 2022

(65) Prior Publication Data

US 2022/0214583 A1 Jul. 7, 2022

Related U.S. Application Data

(63) Continuation of application No. 16/870,362, filed on May 8, 2020, now Pat. No. 11,287,699, which is a
(Continued)

(30) Foreign Application Priority Data

Sep. 28, 2012 (JP) .................................. 2012-217725

(51) Int. Cl.
*G02F 1/1337* (2006.01)
*G02F 1/1335* (2006.01)
(Continued)

(52) U.S. Cl.
CPC .. *G02F 1/133707* (2013.01); *G02F 1/133512* (2013.01); *G02F 1/134372* (2021.01);
(Continued)

(58) Field of Classification Search
CPC ......... G02F 1/133512; G02F 1/133707; G02F 1/134363; G02F 1/134372; G02F 1/136286
See application file for complete search history.

(56) References Cited

U.S. PATENT DOCUMENTS 6,256,081 B1 7/2001 Lee et al.
6,285,431 B2 * 9/2001 Lyu ........................ G02F 1/1393
349/143
(Continued)

FOREIGN PATENT DOCUMENTS

JP 2008-52161 3/2008
JP 2009-145366 7/2009
(Continued)

OTHER PUBLICATIONS

Notification of Reasons for Refusal issued in connection with Korean Patent Application No. 10-2013-114774, dated Aug. 30, 2014. (10 pages).

(Continued)

*Primary Examiner* — Paisley L Wilson
(74) *Attorney, Agent, or Firm* — K&L Gates LLP

(57) ABSTRACT

A liquid crystal display is provided and includes first substrate; data and gate lines on first substrate; first electrode arranged over data and gate lines; insulating layer on first electrode; second electrode on insulating layer including connection electrode, wherein projection electrodes connected to connection electrode; second substrate; black matrix on second substrate including first black matrix with a constant width, a second black matrix; and liquid crystal layer sandwiched between first and second substrates, wherein width of first black matrix is wider than width of second black matrix, where second black matrix overlaps connection electrode so as to dispose connection electrode inside of second black matrix in plan view.

4 Claims, 28 Drawing Sheets

Related U.S. Application Data continuation of application No. 16/247,129, filed on Jan. 14, 2019, now Pat. No. 10,649,287, which is a continuation of application No. 15/186,822, filed on Jun. 20, 2016, now Pat. No. 10,222,660, which is a continuation of application No. 14/033,132, filed on Sep. 20, 2013, now Pat. No. 9,383,614.

(51) Int. Cl.
*G02F 1/1362* (2006.01)
*G02F 1/1343* (2006.01)

(52) U.S. Cl.
CPC .. *G02F 1/136286* (2013.01); *G02F 1/133738* (2021.01); *G02F 1/133749* (2021.01); *G02F 1/133784* (2013.01)

(56) References Cited

U.S. PATENT DOCUMENTS

| | | | |
|---|---|---|---|
| 6,618,109 B2 | 9/2003 | Hidehira et al. | |
| 6,636,289 B2 | 10/2003 | Yoo | |
| 6,646,707 B2 | 11/2003 | Noh et al. | |
| 6,816,222 B2 | 11/2004 | Ono et al. | |
| 7,136,130 B2 | 11/2006 | Ono et al. | |
| 7,295,268 B2 | 11/2007 | Ono et al. | |
| 7,636,142 B2 | 12/2009 | Aota | |
| 7,782,432 B2 | 8/2010 | Wanag | |
| 7,812,909 B2 | 10/2010 | Cho | |
| 8,098,356 B2 | 1/2012 | Itou | |
| 8,130,353 B2 | 3/2012 | Lee | |
| 8,289,489 B2 | 10/2012 | Im et al. | |
| 8,325,305 B2 | 12/2012 | You et al. | |
| 8,514,359 B2 | 8/2013 | Takeda et al. | |
| 8,605,243 B2 | 12/2013 | Sato | |
| 8,724,064 B2 | 5/2014 | Son et al. | |
| 2011/0037931 A1 | 2/2011 | Im et al. | |
| 2012/0008073 A1 | 1/2012 | Ota | |
| 2012/0050643 A1* | 3/2012 | Li | G02F 1/133707 349/139 |
| 2012/0162589 A1 | 6/2012 | Yoso | |
| 2012/0182511 A1 | 7/2012 | Hisada | |
| 2013/0093987 A1 | 4/2013 | Kang | |
| 2013/0242221 A1* | 9/2013 | Nishida | G02F 1/134363 349/43 |

FOREIGN PATENT DOCUMENTS

| | | |
|---|---|---|
| JP | 2011-185964 | 9/2011 |
| KR | 10-1999-0062389 | 7/1999 |
| KR | 10-2002-0056725 | 7/2002 |
| KR | 10-2002-0063498 | 8/2002 |
| KR | 10-2002-0005888 | 1/2010 |
| TW | 546532 | 8/2003 |
| TW | 201107830 | 3/2011 |
| TW | 201116908 | 5/2011 |

OTHER PUBLICATIONS

Notification of Reasons for Refusal issued in connection with Japanese Patent Application No. 2012-217725, dated Jan. 6, 2015. (4 pages).

Notification of Examination Opinion issued in connection with Taiwan Patent Application No. 102131573, dated Apr. 28, 2015. (13 pages).

* cited by examiner

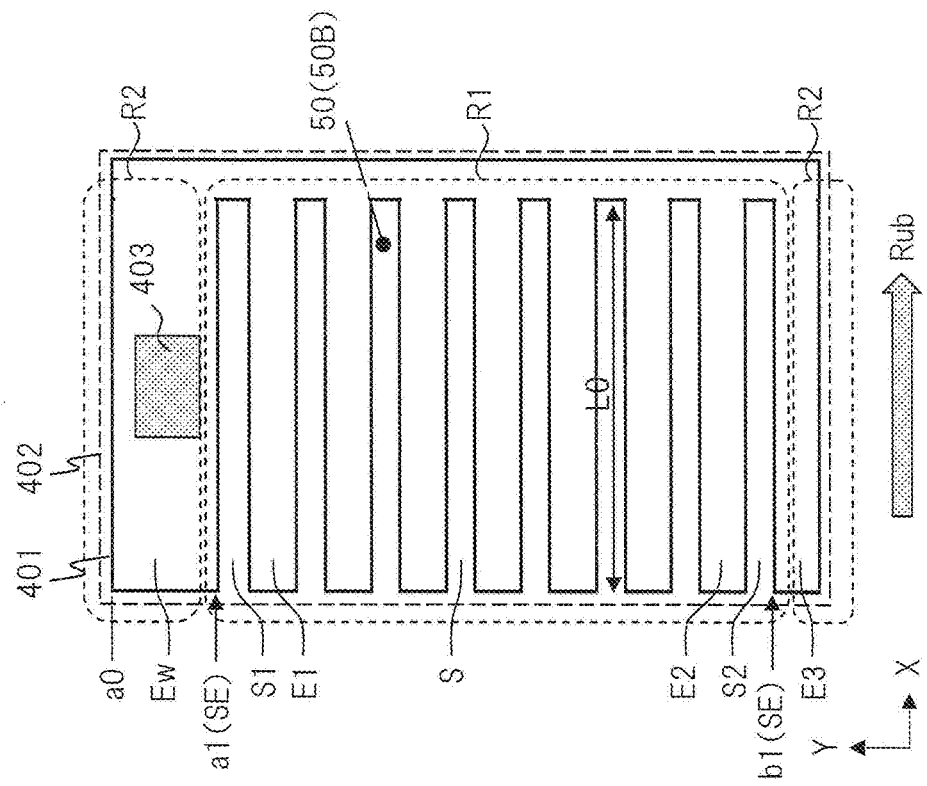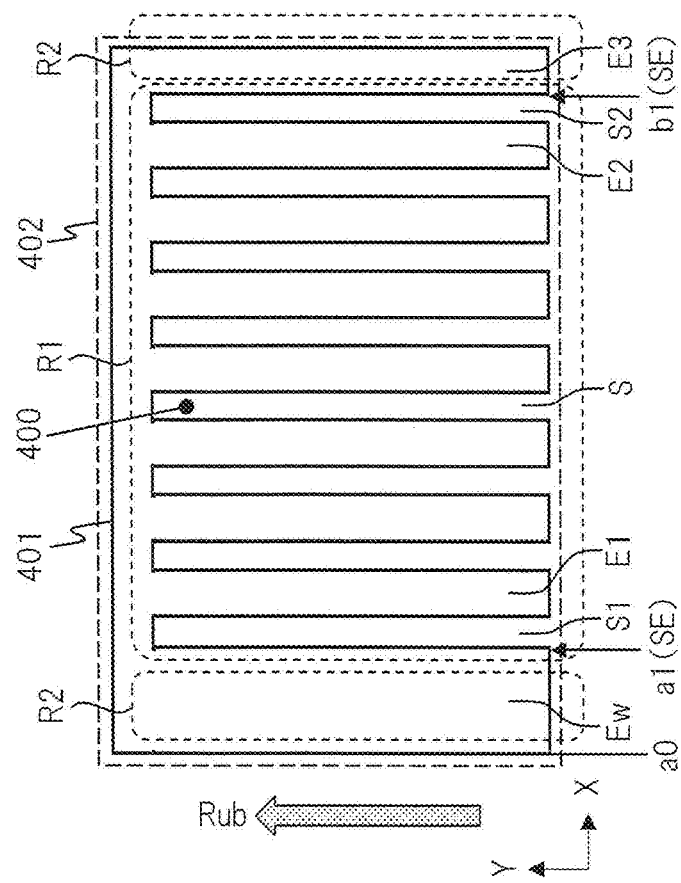

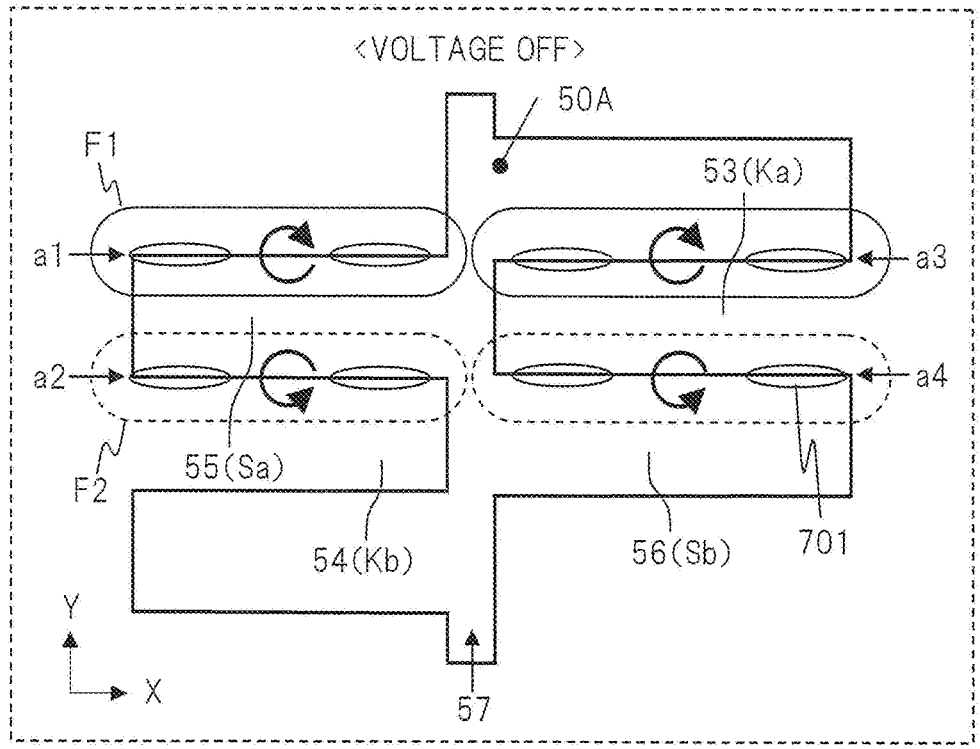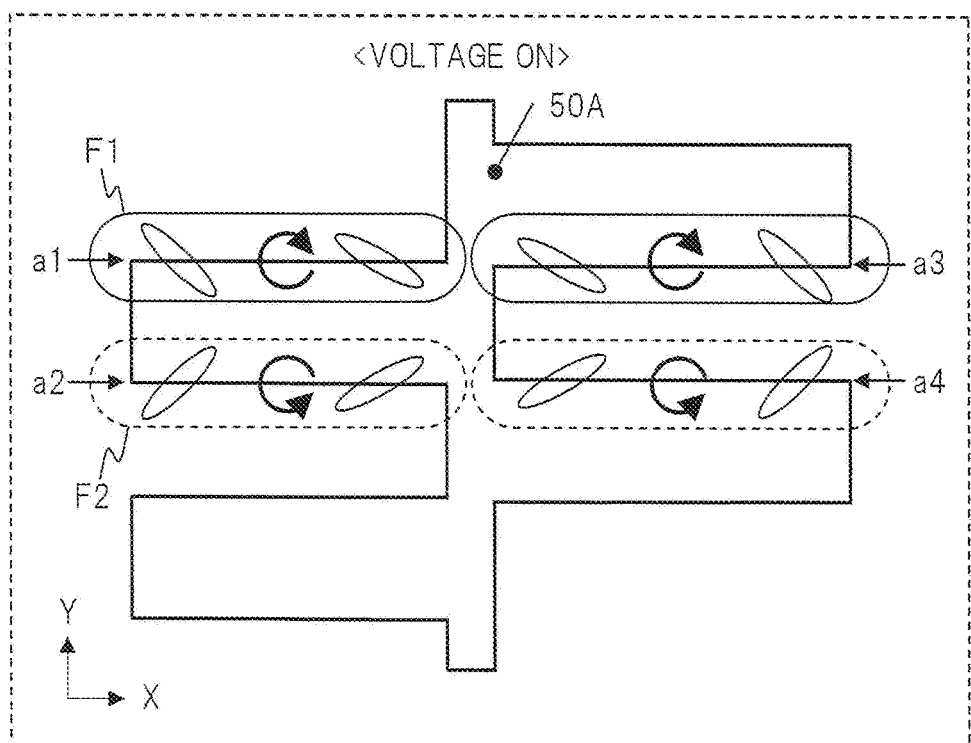

FIG. 9

| SLIT LENGTH L2 [μm] | ANGLE θ [DEGREE] | DETERMINATION |
|---|---|---|
| 15 | 0.55 | ◎ |
|  | 0.55 | ◎ |
| 30 | 0.00 | × |
|  | 0.22 | × |
|  | 0.55 | △ |
|  | 0.62 | ◎ |
|  | 0.70 | △ |
|  | 1.01 | ◎ |
| 62.5 | 0.00 | × |
|  | 0.69 | ◎ |

*FIG. 30*

| | FIRST EMBODIMENT (CONFIGURATION A) | SECOND EMBODIMENT (CONFIGURATION B) |
|---|---|---|
| CHARACTERISTIC (1) | ○LIGHT-SHIELDING WIDTH (H) FROM SLIT END: H ≥ CELL THICKNESS d × 5/3 μm (※h1>H) | ○SAME AS ON THE LEFT |
| CHARACTERISTIC (2) | ○SLIT PITCH (p): p<9 μm | ○SAME AS ON THE LEFT |
| CHARACTERISTIC (3) | ○COMB TOOTH (TRAPEZOID) ANGLE (θ): θ > 0.5° | ○SAME AS ON THE LEFT |
| CHARACTERISTIC (4) | ○LONGITUDINAL SLIT WIDTH W: W≦4 μm | ○SAME AS ON THE LEFT |
| CHARACTERISTIC (5) | ○Δnd (RETARDATION R): Δnd(R) ≥ 0.11 × CELL THICKNESS d | ○SAME AS ON THE LEFT |
| CHARACTERISTIC (6) | ○LIQUID CRYSTAL ELASTIC CONSTANT: K22>7.2 | ○SAME AS ON THE LEFT |

LIQUID CRYSTAL DISPLAY

CROSS REFERENCES TO RELATED APPLICATIONS

The present application is a continuation application of U.S. patent application Ser. No. 16/870,362, filed on May 8, 2020, which application is a continuation of U.S. patent application Ser. No. 16/247,129, filed on Jan. 14, 2019, issued as U.S. Pat. No. 10,649,287 on May 12, 2020, which application is a continuation of U.S. patent application Ser. No. 15/186,822, filed on Jun. 20, 2016, issued as U.S. Pat. No. 10,222,660 on Mar. 5, 2019, which application is a continuation application of U.S. patent application Ser. No. 14/033,132, filed on Sep. 20, 2013, issued as U.S. Pat. No. 9,383,614 on Jul. 5, 2016, which application claims priority to Japanese Priority Patent Application JP 2012-217725 filed in the Japan Patent Office on Sep. 28, 2012, the entire content of which is hereby incorporated by reference.

BACKGROUND

The present invention relates to techniques for a display device and electronic equipment. In particular, the present invention relates to a liquid crystal display device (abbreviated as LCD) which controls liquid crystal molecules by a horizontal electric field system and the like.

In liquid crystal display devices mounted on various types of electronic equipment, there are an IPS (In-Plane-Switching) system (also referred to as mode), an FFS (Fringe Field Switching) system and the like as the horizontal electric field system. The horizontal electric field system is advantageous in such points as a wide viewing angle and an aperture ratio (area ratio of a region effective for display in one pixel region) as compared with a vertical electric field system.

As an example of a prior art technique relating to the FFS, there is Japanese Patent Application Laid-Open Publication No. 2008-52161 (Patent Document 1). The Patent Document 1 (Liquid Crystal Device and Electronic Equipment) describes a liquid crystal device of an FFS system which realizes a bright display with a high aperture ratio without making a configuration of the device complicated.

In the IPS mode, a pixel electrode and a common electrode are provided in the same layer, and electric field is mainly generated in a direction parallel to a substrate surface (defined as X and Y directions). Therefore, electric field is hardly formed in a region just above the pixel electrode, so that it is difficult to drive liquid crystal molecules in the region positioned just above the pixel electrode.

On the other hand, in the FFS mode, a pixel electrode and a common electrode are provided so as to be stacked in a direction perpendicular to a substrate surface (defined as Z direction) via a dielectric film interposed therebetween, and electric field in an oblique direction with respect to the substrate surface or in a parabolic shape (also referred to as fringe electric field) is generated. Therefore, even the liquid crystal molecules in a region positioned just above the pixel electrode can be easily driven. More specifically, an aperture ratio higher than that in the IPS mode can be obtained in the FFS mode. Hereinafter, an electrode positioned on an upper side in the stacked electrodes is referred to as an upper electrode (first electrode), and an electrode on a lower side is referred to as a lower electrode (second electrode).

SUMMARY

However, even the liquid crystal display device of the FFS system mentioned above has such a problem as a slow response speed. Note that the response speed mentioned here indicates a speed when the transmittance of liquid crystal is changed between predetermined levels at the time of applying a voltage to a pixel (including the upper and lower electrodes). More specifically, the response speed is defined by the time required for the change from an OFF state (for example, transmittance=0) to an ON state (for example, transmittance=1) or by the time required for the reverse change thereof.

In view of these circumstances, a main object of the present invention is to provide a display device of a new system which can improve a response speed, display quality, and the like as compared with the conventional FFS system or the like in addition to the wide viewing angle and the high aperture ratio.

A representative embodiment of the present invention is a display device, electronic equipment or the like and has the following configuration.

(1) The display device of the present embodiment is a display device having a liquid crystal layer between a first substrate and a second substrate opposed to each other, and it includes: in a case where a substrate in-plane direction corresponding to a screen is defined as first and second directions and a perpendicular direction is defined as a third direction, an electrode layer which has an upper electrode and a lower electrode opposed to each other and in which an opening portion having a plurality of slits extending in the first direction is formed in the upper electrode or the lower electrode; and a first light-shielding film portion extending in the first direction and provided in the first or second substrate. The liquid crystal layer is provided on the electrode layer and liquid crystal molecules in neighboring regions on one side and the other side opposed to each other in a width direction of the slits of the opening portion are rotated in directions opposite to each other to be oriented. In the opening portion, for each pixel, at least part of an end portion of at least one outermost slit of outermost slits in the second direction is concealed by the first light-shielding film portion overlapped in the third direction.

In particular, the first substrate has the electrode layer and a first alignment film positioned between the electrode layer and the liquid crystal layer. The second substrate has a second alignment film between the second substrate and the liquid crystal layer, the first alignment film is subjected to rubbing process in a first rubbing direction which is approximately parallel to the first direction, the second alignment film is subjected to rubbing process in a second rubbing direction which is a direction opposite to the first rubbing direction of the first alignment film, and long axes of liquid crystal molecules are aligned in the first rubbing direction as an initial orientation state of liquid crystal in the liquid crystal layer.

In particular, the width of the first light-shielding film portion in the second direction is equal to or more than a width (H) of a predetermined distance ranging from a line of an end portion of the outermost slit of the opening portion to the outside. In other words, the width of the first light-shielding film portion in the second direction has a size capable of concealing at least a region of the width (H) of the predetermined distance.

In particular, the first substrate has a first electrode line extending in the first direction and a switching element connected to the first electrode line, which are components constituting the pixel, the first light-shielding film portion is disposed so as to overlap the first electrode line and the switching element, and the width of the first light-shielding film portion in the second direction is a width which conceals the first electrode line and the switching element.

(Configuration A) In particular, the upper electrode is a common electrode having an opening for each pixel, the lower electrode is a pixel electrode having an electrode portion for each pixel, and a region of the opening of the upper electrode constitutes the opening portion in a plan view.

(Configuration B) In particular, the upper electrode is a pixel electrode having an electrode portion for each pixel, the lower electrode is a common electrode, and a region positioned outside the upper electrode constitutes the opening portion in a plan view.

(Configuration α) In particular, the opening portion has, for each pixel, a communication opening portion extending in the second direction and a plurality of slits connected to both sides of the communication opening portion and extending in the first direction. A plurality of first slits extending in the first direction are arranged on one side of the communication opening portion in the second direction, and a plurality of second slits extending in the first direction are arranged on the other side thereof in the second direction. One end of a long side of the slit constitutes a corner portion closed by the upper electrode and the other end thereof constitutes a corner portion opened to the communication opening portion. The plurality of slits on both sides of the communication opening portion are alternately arranged so that positions thereof are shifted in the second direction. A long side of the first slit connected to one side of the communication opening portion and a long side of the second slit connected to the other side thereof are aligned on a line in the first direction.

(Configuration β) In particular, the opening portion has, for each pixel, a communication opening portion extending in the second direction and a plurality of slits connected to one side of the communication opening portion and extending in the first direction. The plurality of slits extending in the first direction are arranged in the second direction on one side of the communication opening portion. One end of a long side of the slit constitutes a corner portion closed by the upper electrode and the other end thereof constitutes a corner portion opened to the communication opening portion.

(Shape a) In particular, the upper electrode has a plurality of projecting portions for constituting the plurality of slits, and the slits and the projecting portions are trapezoids which are long in the first direction and have an upper side on a pixel-inner side.

(Shape b) In particular, the upper electrode has a plurality of projecting portions for constituting the plurality of slits, and the slits and the projecting portions are rectangles which are long in the first direction.

(2) In particular, as a panel configuration, the first substrate has the first electrode line parallel to the first direction, a second electrode line parallel to the second direction, and a switching element connected to the first electrode line and the second electrode line for each pixel, and a pixel electrode is connected to the switching element. In the second substrate, the light-shielding film has a first light-shielding film portion extending in the first direction and a second light-shielding film portion extending in the second direction. The first light-shielding film portion overlaps the first electrode line and the switching element, and the second light-shielding film portion overlaps the second electrode line. Also, the width of the first light-shielding film portion is larger than a width of the second light-shielding film portion.

(3) The display device includes: a panel with the configuration described above; a first driver connected to a first electrode line of the panel to drive it; a second driver connected to a second electrode line of the panel to drive it; a third driver connected to an upper electrode and a lower electrode of the panel to drive them; and a controller which controls driving of the first to third drivers.

(4) Electronic equipment of the present invention includes the display device described above; a control unit which performs display control process to the display device; and a storage unit which stores display data provided to the display device.

According to the representative embodiment of the present invention, it is possible to provide a display device of a new system (high-speed horizontal electric field mode) which can improve the response speed, the display quality, and the like as compared with the conventional FFS system or the like in addition to the wide viewing angle and the high aperture ratio. The response speed, the brightness, and the orientation stability in pixels can be improved, and the display quality can be improved by uniformizing the pixel characteristics.

Additional features and advantages are described herein, and will be apparent from the following Detailed Description and the figures.

BRIEF DESCRIPTION I/F THE FIGURES

FIG. 3A is a diagram showing shapes of opening portions and electrodes of a pixel (configuration β) in the case of longitudinal slits;

FIG. 3B is a diagram showing shapes of opening portions and electrodes of a pixel (configuration β) in the case of lateral slits (present embodiment);

FIG. 6A is a partially-enlarged diagram of FIG. 5 for describing liquid crystal orientation and the like at the time of voltage-OFF;

FIG. 6B is a partially-enlarged diagram of FIG. 5 for describing liquid crystal orientation and the like at the time of voltage-ON;

FIG. 7B is a diagram showing a cross section taken along line A-A' of FIG. 5 for describing liquid crystal orientation at the time of voltage-ON;

FIG. 9 is a diagram collectively showing configuration examples of upper and lower electrodes in the present embodiment;

FIG. 27A is an explanatory diagram regarding a fifth characteristic (retardation R=Δnd), showing a cell thickness d and the like;

FIG. 30 is a diagram collectively showing the preferred conditions of characteristics for the display device of the present embodiment.

DETAILED DESCRIPTION

Hereinafter, embodiments of the present invention will be described in detail with reference to the accompanying drawings. Note that the same components are denoted by the same reference symbols throughout the drawings for describing the embodiments, and the repetitive description thereof will be omitted. Also, for making the features of the invention easily understood, the hatching of the cross section is arbitrarily omitted and main components are highlighted. Furthermore, the dimensions and the scale are sometimes different from those in actual cases.

<Outline>

In the embodiments, the case of application to a liquid crystal display device (LCD) which can display a color moving image on a screen and electronic equipment on which the LCD is mounted will be described. In FIG. 1 to FIG. 9, a basic embodiment including premise will be described. Based on the basic embodiment, a first embodiment will be described in FIG. 10 to FIG. 15, and a second embodiment will be described in FIG. 16 to FIG. 19. In FIG. 20 to FIG. 30, preferable conditions for characteristics will be described.

Figure 2:
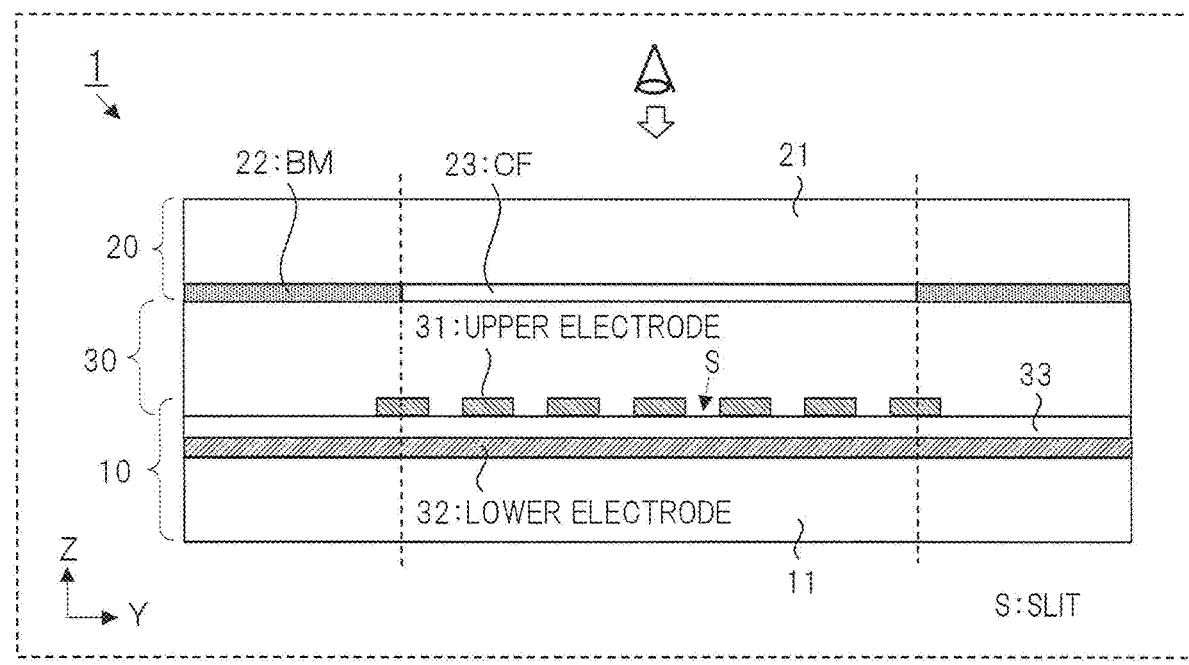
FIG. 2 is a diagram showing a schematic structure of a cross section of pixels of a liquid crystal panel of the display device of the present embodiment.
Figure 4B:
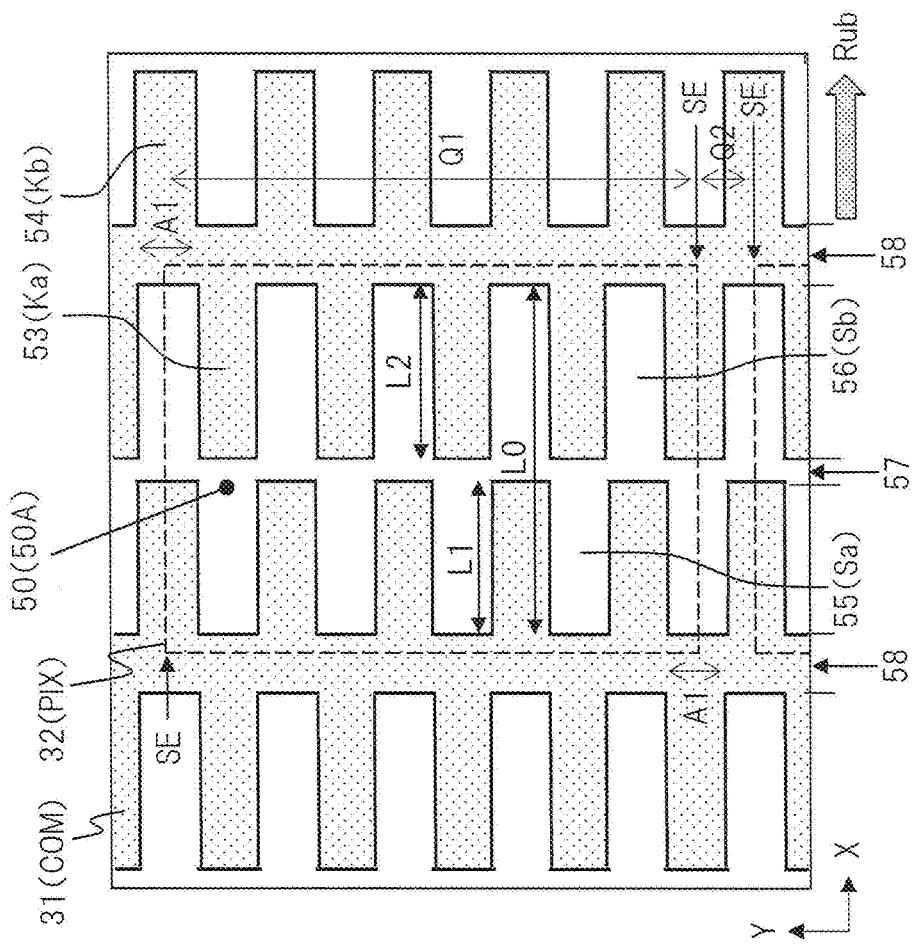
FIG. 4B is a diagram showing shapes of opening portions and electrodes of a pixel (configuration α) in the case of lateral slits (present embodiment)
Figure 10:
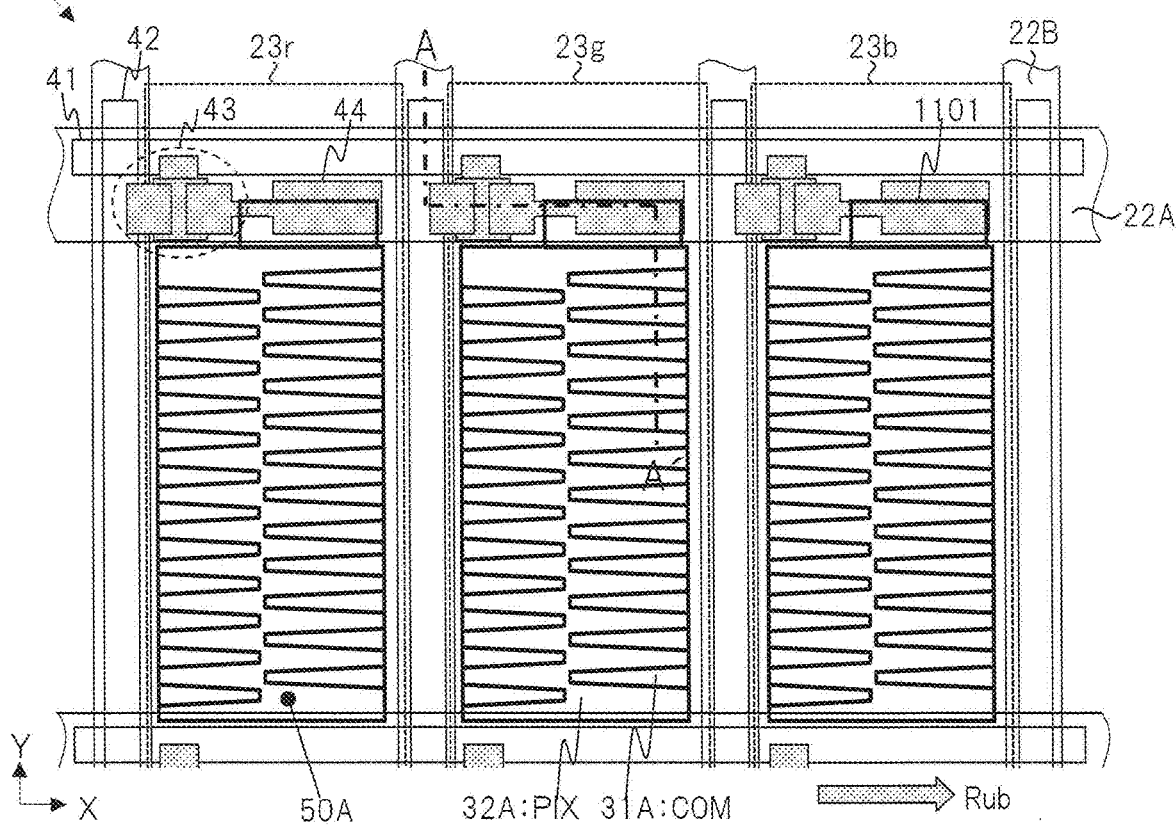
FIG. 10 is a diagram showing a planar structure of pixels of a display device (liquid crystal panel) of a first embodiment.
Figure 12:
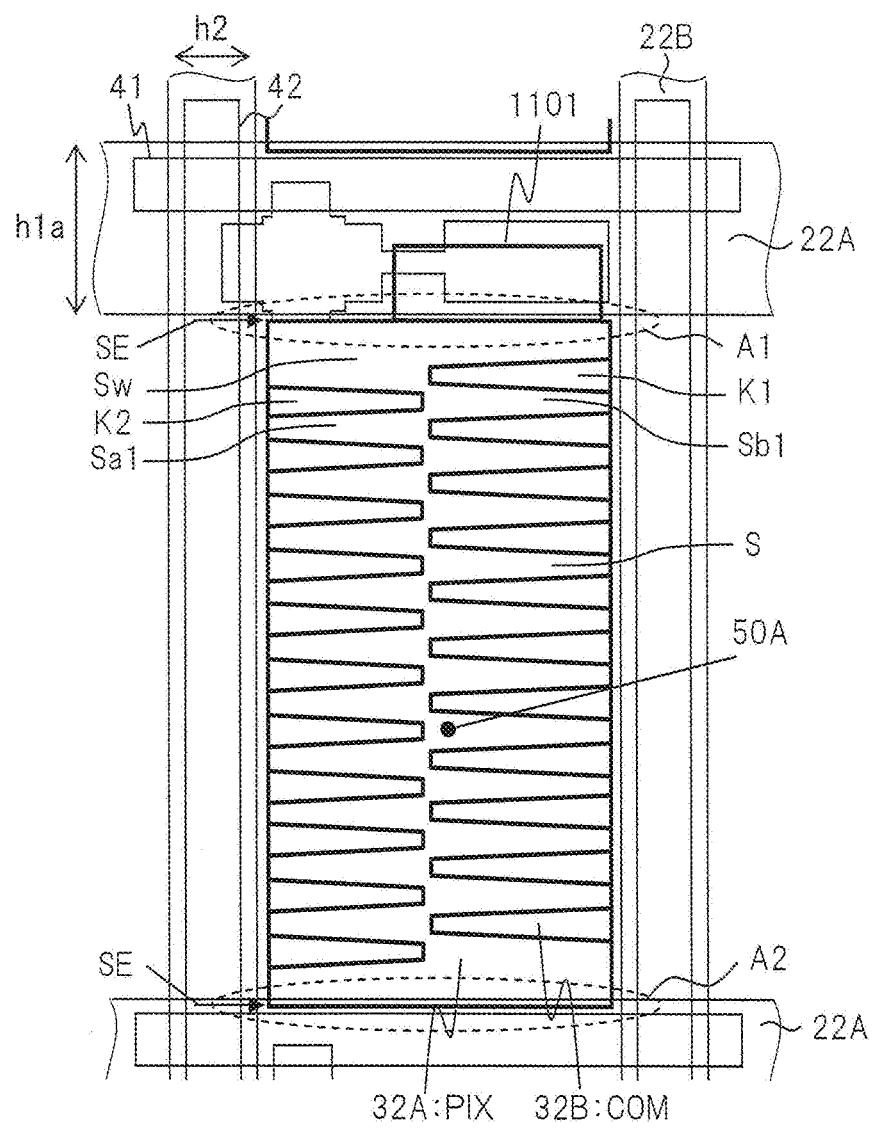
FIG. 12 is a diagram showing a first light-shielding configuration example in the first embodiment.

A liquid crystal panel 1 of the present embodiment basically adopts a horizontal electric field mode as shown in FIG. 2, but it adopts a new system (high-speed horizontal electric field mode different from the conventional FFS system) obtained by applying a rubbing process of an anti-parallel orientation in a direction parallel to an extension direction (X) of a slit 50A as shown in FIG. 4B, FIG. 10, FIG. 12, and the like. The details of the high-speed horizontal electric field mode will be described later. The liquid crystal panel 1 of the embodiment is structured to have an opening portion (also referred to as slit) 50A formed by upper and lower electrodes (31, 32) and adapted to the high-speed horizontal electric field mode. The opening portion 50A is formed to have a comb-like shape including a plurality of lateral (X-directional) slits S. Further, in the liquid crystal panel 1 of the present embodiment, an end portion (A1 and the like) of the opening portion (slit) 50A of a pixel in a longitudinal (Y) direction is concealed by a wider one (lateral BM portion 22A) of light shielding films (BM) 22. This is because the high-speed response expected in the above-described high-speed horizontal electric field mode cannot be achieved and a response speed approximately equal to that of the conventional FFS mode is merely obtained. More specifically, by concealing the end portion (A1 and the like) of the slit 50A by the BM22, the characteristic (second characteristic in which the response speed is approximately equal to that of the conventional FFS system at the end portion of the slit 50A) of the region of the end portion of the pixel (indicated by Q2 in FIG. 4B) is suppressed to uniformize the overall characteristic to the characteristic (first characteristic in which a high response speed is achieved by the high-speed horizontal electric field mode) of the region (Q1) inside the pixel.

[Electronic Equipment/Liquid Crystal Display Device]

Figure 1:
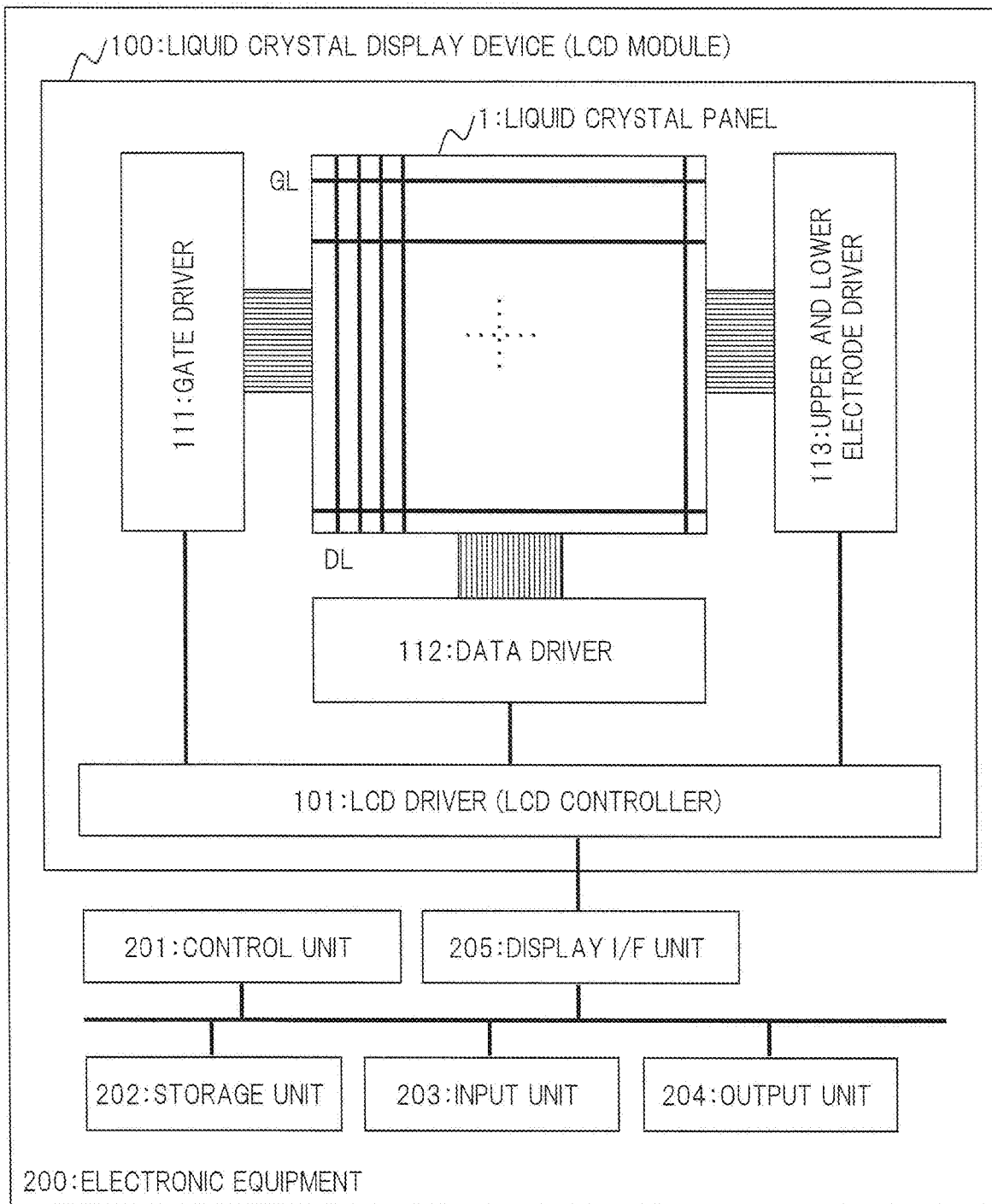
FIG. 1 is a diagram showing a block configuration of a display device and electronic equipment according to an embodiment of the present invention.

FIG. 1 shows a block configuration of a liquid crystal display device 100 which is a display device of the present embodiment and electronic equipment 200 on which the liquid crystal display device 100 is mounted. The electronic equipment 200 includes the liquid crystal display device (in other words, LCD module) 100, a control unit 201, a storage unit 202, an input unit 203, an output unit 204, a display I/F (interface) unit 205, and the like. The control unit is composed of, for example, CPU, ROM, RAM, and a program running on these members. For example, the CPU controls the electronic equipment 200 by computing process in accordance with a program loaded from the ROM to the RAM. The storage unit 202 is composed of a primary memory, a secondary memory, and data information including video data and the like stored therein. The input unit 203 is composed of an input device such as a button and an I/F processing unit thereof. The output unit 204 is composed of an output device other than the display device and an I/F processing unit thereof. The display I/F unit 205 connects the liquid crystal display device 100 to perform I/F processing thereof. A communication I/F unit, a power source unit and the like (not shown) are also provided.

The liquid crystal display device (LCD module) 100 is configured to have a liquid crystal panel 1, an LCD driver 101 (in other words, an LCD controller) which performs main drive control, and respective drivers (gate driver 111, data driver 112, upper and lower electrode driver 113) which drive respective signal lines of the liquid crystal panel 1. For example, the respective drivers are mounted by the circuits on a flexible printed circuit board on which an IC chip is formed or a glass substrate of the liquid crystal panel 1. Note that the respective drivers may be properly provided in an integrated manner or in a separated manner.

The control unit receives a video signal from outside or produces a vide signal therein. A video signal or control instruction information is fed from the control unit to the LCD driver 101 via the display I/F unit 205. The LCD driver 101 feeds video/image data and control signals such as a timing signal to respective drivers (111 to 113) to control them. The gate driver 111 feeds scanning signals to a gate line (GL) group of the liquid crystal panel 1 in accordance with the control. The data driver 112 feeds a data signal to a data line (GL) group of the liquid crystal panel 1 in accordance with the control. The upper and lower electrode driver 113 feeds corresponding voltage signals (namely, a pixel voltage to a pixel electrode PIX and a common voltage to a common electrode COM) to an upper electrode 31 and a lower electrode 32 (FIG. 2) of the liquid crystal panel 1 in accordance with the control.

As examples of the electronic equipment 200, various types of devices such as a television set (in other words, liquid crystal TV device), a display for PC, a digital camera/video camera, a laptop PC, a portable phone such as a smart phone, a portable terminal such as a tablet, and a display for car navigation system can be applied. For example, in the case of the liquid crystal TV device or the display for PC, a filter glass or the like is added to a front face of the LCD module 100 and they are held by a casing. For example, in the case of the digital camera or the video camera, a display unit such as a finder/monitor is constituted by the LCD module 100. For example, in the case of the laptop PC, a display screen is constituted by the LCD module 100. For example, in the case of the portable phone, the display screen is constituted by the LCD module 100.

[Liquid Crystal Panel—Cross Section]

FIG. 2 schematically shows a cross-sectional configuration of a pixel taken along a Y-Z plane as a basic structure of the liquid crystal panel 1 shown in FIG. 1. The liquid crystal panel 1 is roughly composed of an array substrate 10 which is a first substrate, a CF substrate 20 (also referred to as opposed substrate) which is a second substrate, and a liquid crystal layer 30 sandwiched and sealed therebetween. Note that FIG. 2 shows a schematic configuration, in which an insulating film, an alignment film, a polarizing plate, a backlight, and other known elements are not illustrated.

The array substrate 10 is a substrate assembly including a structure on a back face side with respect to the line of sight and a glass substrate 11. In the Z direction, a lower electrode 32, a dielectric film 33 and an upper electrode 31 are stacked on the glass substrate 11. Specifically, a gate line, a TFT portion, and the like are also provided, and they are described later. As illustrated, there are overlaps of electrode portions (here, the upper electrode 31) on the opposed faces of the upper electrode 31 and the lower electrode 32, and an opening portion (50 in FIG. 3, FIG. 4, and the like) including slits S is formed in accordance with the shape thereof in a plan view (X-Y). On the electrode layer of the upper and lower electrodes (31, 32) including the opening portion, the orientation of liquid crystal of the liquid crystal layer 30 is controlled in a substrate in-plane direction (X-Y) in this system (namely, a horizontal electric field mode).

One of the upper and lower electrodes (31, 32) is a pixel electrode (PIX), and the other is a common electrode (COM). The upper and lower electrodes (31, 32) constitute an electrode portion for forming the fringe electric field in the liquid crystal layer 30. As the configuration examples of these combinations, various combinations are possible and they are collectively shown in FIG. 9 described later. The common electrode COM is basically formed as a solid layer over a plurality of pixel regions (for example, the screen), and it is controlled to a common potential by the application of a common voltage regardless of respective pixels. The pixel electrode PIX is constituted of a rectangular layer corresponding to each pixel, and a voltage corresponding to each pixel is applied thereto, so that it is controlled to a potential corresponding to each pixel. The upper and lower electrodes (31, 32) are made of a material having visible-light transmissivity and electrical conductivity such as ITO (Indium-Tin-Oxide) (in other words, transparent electrode). In the case where the common electrode COM is constituted of a plurality of blocks or the like instead of the solid layer, these blocks are connected by common electrode lines.

The CF substrate 20 is a substrate assembly including a structure on a front face side with respect to the line of sight and a glass substrate 21. For example, layers of BM 22, CF 23 and the like are formed on an inner face side (indicating a side near the liquid crystal layer 30) on the glass substrate 21 in the Z direction. FIG. 2 shows an example where the BM 22 and the CF 23 are formed in the same layer, but they may be formed in difference layers. An overcoat layer having a function as a planarization/protection layer (not shown) and the like may be provided on (an inner face side of) the BM 22 and the CF 23. Further, an antistatic layer or the like may be provided on the front face side of the CF substrate 20 other than the polarization plate.

The BM 22 is a light-shielding film (also referred to as black film), which reduces crosstalk between pixels and is constituted of a light-shielding (light-absorptive or low light transmissive) material such as a metal material including Cr or stacked color filters of respective colors. The BM 22 is formed in a grid-like shape for defining pixels. The CF 23 is a color filter arranged so as to correspond to a pixel arrangement, and it is composed of respective layers of three colors of, for example, R, G, and B (see FIG. 8 described later). Note that, in the present embodiment, the BM 22 is formed on the CF substrate 20 side, but the BM 22 may be formed on the array substrate 10 side (above the electrode layers of the upper and lower electrodes (31, 32)) as another aspect.

The liquid crystal layer 30 is a layer in which nematic liquid crystal is sealed between the upper and lower substrates (10, 20) via an alignment film. The upper and lower substrates (10, 20) are connected in a frame edge portion of the liquid crystal panel 1 by a sealing material and liquid crystal is sealed inside a space therebetween. In the liquid crystal layer 30, a predetermined rubbing process (described later) is applied to the alignment film, so that the liquid crystal is put into a predetermined initial orientation state.

By applying a voltage from a driver side (FIG. 1) to the upper and lower electrodes (31, 32), a predetermined potential difference corresponding to modulation of transmittance of liquid crystal of a pixel is imparted between the upper and lower electrodes (31, 32) via the dielectric film 33. Fringe electric field is generated in the vicinity of the opening portion (50) of the pixel in the liquid crystal layer 30 by the potential difference, so that the orientation state is controlled so as to mainly rotate liquid crystal molecules in the substrate in-plane direction (X, Y directions).

Polarization plate is disposed on each of the back face side of the array substrate 10 and the front face side of the CF substrate 20, so that a polarization state of transmitted light is controlled. Transmission axes of the upper and lower polarization plates are put in an orthogonal relation (normally-black configuration), and one of them is the same as the rubbing direction (described later).

A backlight or the like is disposed on the back face side of the array substrate 10, and a backlight illumination state or the like is controlled in accordance with LCD control from a driver for backlight control (not shown). By controlling the transmission and polarization lights in accordance with the pixel states on the liquid crystal panel 1 based on the emitted light from the backlight, an image is formed on a screen on the front face side.

[Rubbing Direction]

The liquid crystal in the liquid crystal layer 30 is subjected to rubbing process in a predetermined rubbing direction on upper and lower alignment films (first and second alignment films) of the liquid crystal layer 30 so as to have a predetermined initial orientation corresponding to the high-speed horizontal electric field mode. On the first alignment film between the electrode layers (31, 32) on the array substrate 10 side and the liquid crystal layer 30, rubbing process is performed in a first rubbing direction which is a direction approximately parallel to the X direction in which the slits S or the like extend (Rub in FIG. 3B and FIG. 4B, a direction from the left to the right of the drawing). On the second alignment film between the CF substrate 20 and the liquid crystal layer 30, rubbing process is performed in a second rubbing direction which is a direction opposite to the first rubbing direction of the first alignment film. The high-speed horizontal electric field mode is established by the anti-parallel orientation. In this manner, long axes of the liquid crystal molecules are aligned along the first rubbing direction (Rub) as an initial orientation state of liquid crystal in the liquid crystal layer 30.

The liquid crystal in the liquid crystal layer 30 is made of, for example, nematic liquid crystal having negative dielectric constant anisotropy. In this case, the rubbing direction (Rub) is set parallel to the X direction in which the slits S or the like extend as described above. Note that, in the case where nematic liquid crystal having positive dielectric constant anisotropy is used, the rubbing direction (Rub) is set parallel to the orthogonal direction (Y). The above-described rubbing direction (Rub) is not limited to a direction completely parallel to the X direction in which the slits S or the like extend, and an angle to a certain extent (for example, one degree) is allowed.

[Manufacturing Method]

A manufacturing method of a liquid crystal panel 1 is, for example, the following processes, and the case of a configuration A shown in FIG. 9 will be described. On the array substrate 10 side, layers for gate lines, data lines, a TFT portion, and the like are formed on the glass substrate 11. An insulating film having a function as a planarization layer is formed thereon. The insulating film is made of a material such as polyimide or silicon oxide. The lower electrode 32 (pixel electrode PIX) is formed on the insulating film by patterning such as photo-etching of ITO. The thickness of the pixel electrode PIX is, for example, 500 to 1500 angstroms. The dielectric film 33 is formed over a whole surface of the lower electrode 32 as a solid layer. The dielectric film 33 has insulation properties and protection properties, is made of a material such as silicon nitride or silicon oxide, and is formed by a plasma CVD method or the like. The thickness of the dielectric film 33 is, for example, 100 to 1000 angstroms. The upper electrode 31 (common electrode COM) made of ITO is formed on the dielectric film 33. For example, the common electrode COM constituted of a solid layer having slits (opening portion) is formed by sputtering, etching, or the like. The thickness of the common electrode COM is, for example, 100 to 1000 angstroms. The first alignment film subjected to the rubbing process in a predetermined rubbing direction is formed on the upper electrode 31. The alignment film is constituted of the film obtained by performing rubbing process to a polymer material such as polyimide.

On the CF substrate 20 side, the layers of CF 23, BM 22 and the like are formed on the glass substrate 21, an overcoat layer or the like is formed thereon, and the second alignment film obtained by performing the rubbing process in a predetermined direction is formed thereon. The liquid crystal layer 30 is formed by causing the array substrate 10 and the CF substrate 20 to face each other, injecting liquid crystal therebetween, and then connecting the substrates 10 and 20 in a frame edge portion by a sealing material. A polarization plate, a backlight, and the like are attached to the back face side of the liquid crystal panel 1 and a polarization plate and the like are attached to the front face side thereof. Respective drivers (FIG. 1) are connected to electrode ends of the frame edge portion of the liquid crystal panel 1, thereby constituting the liquid crystal display device 100.

[Pixel (Configuration B, Configuration β)]

FIGS. 3A and 3B show the configurations of electrodes, an opening portion, and the like of a pixel on an X-Y plane in the case of a configuration B and a configuration β shown in FIG. 9, and characteristics of a slit end portion or the like will be described. The configuration B shows a case where the upper electrode 31 is a pixel electrode PIX and the lower electrode 32 is a common electrode COM, and the configuration β shows a case of one-side comb-like shape. FIG. 3A shows a case in which longitudinal slits existing in the conventional FFS system are provided, and FIG. 3B shows a case in which lateral slits (S) of the present embodiment are provided. Since the configuration β is simpler in shape than the configuration α, the configuration β is described first.

In FIG. 3A, a reference numeral 401 denotes an electrode portion of an upper electrode (pixel electrode PIX). Since a lower electrode (common electrode COM) facing the upper electrode in the Z direction is a solid layer, the illustration thereof is omitted. A reference numeral 402 denotes a schematic pixel region corresponding to the region of 401. A reference numeral 400 denotes a region of a slit (in other words, opening portion) formed by the upper and lower electrodes, and it corresponds to a region outside the electrode portion 401. In this region, only a portion of the lower electrode (COM) is present, and a portion of the upper electrode (PIX) does not overlap the lower electrode. Note that the shape of the pixel electrode, the number of comb teeth and the like can be adjusted in accordance with the pixel design. In FIG. 3A, a laterally-long shape is shown for easy understanding in comparison with FIG. 3B, but a longitudinally-long shape is adopted in the case where a longitudinally-long pixel is formed.

A reference sign S denotes an individual slit in a longitudinal (Y) direction (in other words, opening, clearance, or the like). Note that the reference numeral 400 denotes the slits (opening portion) on a whole pixel, which includes a plurality of individual slits S. Reference signs S1 and S2 denote a left-side outermost slit and a right-side outermost slit in the X direction of a plurality of slits S having the same shape. Each slit S has one end (upper side in FIG. 3A) closed by the electrode portion 401 and the other end (lower side in FIG. 3B) opened and connected to adjacent slits. Reference sings E1, E2, and E3 denote projecting portions (in other words, comb teeth) of the electrode portion 401 extending in the Y direction. In this case, each comb tooth has a rectangular shape. The slit S is formed by a pair of the comb teeth adjacent to each other in the X direction. A reference sign Ew denotes a wider projecting portion of the electrode portion 401, in other words, a pixel electrode end portion. A reference sign a0 denotes an end line of the pixel (401, Ew). A reference sign a1 denotes a line of a slit end SE of the slit end portion (end portion of the outermost slit S1). The same is true of reference signs S2 and b1 (SE).

A reference sign R1 denotes a pixel-inside region having a boundary in the vicinity of a1 (SE) and b1 (SE), in which the above-described first characteristic is secured. A reference sign R2 denotes a pixel end portion region positioned outside the region R1 (SE), which is a region having the above-described second characteristic of relatively slow response speed which is different from the first characteristic of R1.

In FIG. 3A, the rubbing direction (Rub) on the array substrate side is a direction toward a closed end side of the slit S in the longitudinal (Y) direction (from bottom to top in FIG. 3A).

FIG. 3B approximately corresponds to a configuration in which FIG. 3A has been rotated in a clockwise direction by 90° (details of the pixel electrode and the like are omitted). A reference numeral 50B denotes a region of an opening portion (slit) in a whole pixel formed by the upper and lower electrodes (401, 402) in the case of the configuration B. A reference numeral 401 corresponds to the upper electrode 31 (PIX) and a reference numeral 402 corresponds to the schematic pixel region of the lower electrode 32 (COM). Also, a reference numeral 403 denotes an example of a connection portion with a TFT portion 43 (contact receiver 44 connected thereto) described later. A reference sign L0 denotes a length of the slit S. In the case where the configuration of the upper and lower electrodes (31, 32) and the opening portion 50B shown in FIG. 3B is applied to an LCD, the region of R1 defined by the slit ends SE serving as boundaries is caused to have the above-described first characteristic with a high-speed responsiveness corresponding to the new system (high-speed horizontal electric field mode) of the present embodiment. However, the region of R2 has the above-described second characteristic with relatively slow responsiveness or the like. In detail, the region of R2 is slower in response speed at the time of applying a voltage than the region of R1, and R2 is different from R1 in luminance curve, orientation stability, and the like. Since the region of R1 and the region of R2 are different in initial orientation state from each other, there is a possibility that distortion on display occurs due to orientation abnormality in the region of R2.

Therefore, in the present embodiment (second embodiment described later), the region of R2 is a candidate region to be concealed by overlapping it with BM 22 (lateral BM portion 22A). More specifically, the pixel configuration in which the region of R2 is concealed by the lateral BM portion 22A with a large width is adopted. In this manner, the new system (high-speed horizontal electric field mode) in which characteristics such as a response speed are improved and uniformized in the pixel can be realized. The luminance curve and the orientation stability can be also uniformized in addition to the responsiveness, so that the display quality can be improved.

As shown in FIG. 3B, by adopting the configuration of the opening portion 50B having the slits S extending in the lateral (X) direction, light shielding for the pixel end portion region (R2) can be easily made by the lateral BM portion 22A with a large width as described later (FIG. 8), and an efficient pixel configuration can be realized. For example, it is possible to take a wide region effective for display of a pixel. By way of comparison, in the case where the regions (R2) at the left and right end portions of the pixel are concealed by the BM 22 (longitudinal BM portion 22B) in FIG. 3A, there is a demerit that it is impossible to take a wide region effective for display of the pixel and an inefficient pixel configuration is formed.

Figure 16:
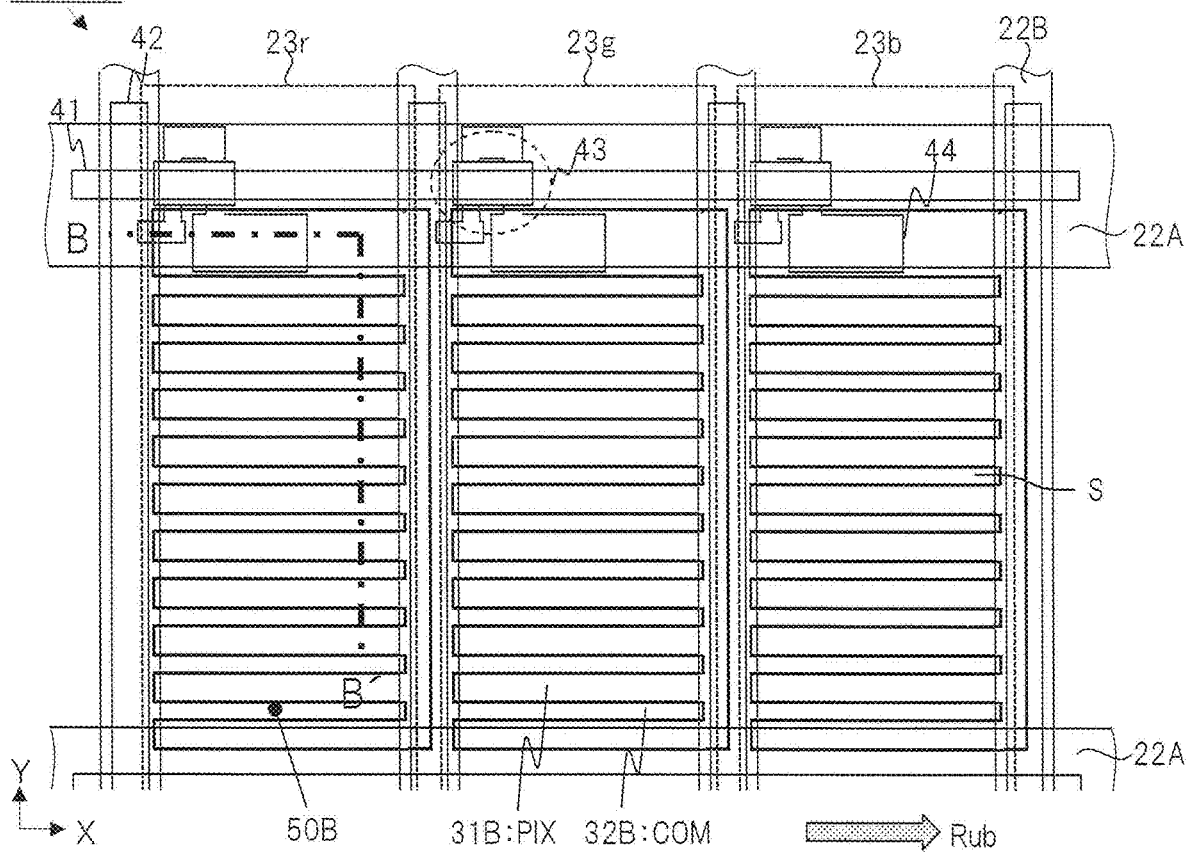
FIG. 16 is a diagram showing a planar structure of pixels of a display device (liquid crystal panel) of a second embodiment.

As described above, in the case where the slit end portions corresponding to the regions of R2 on both ends of the pixel are positioned between pixels, the opening portion 50B having the slit S extending in the X direction is disposed in conformity with the configuration of the lateral BM portion 22A as shown in FIG. 3B so that the difference in the characteristics of R1 and R2 (for example, leakage light caused due to the difference in the characteristics) can be efficiently hidden (FIG. 16 described later and the like).

[Pixel (Configuration A, Configuration α)]

Figure 4A:
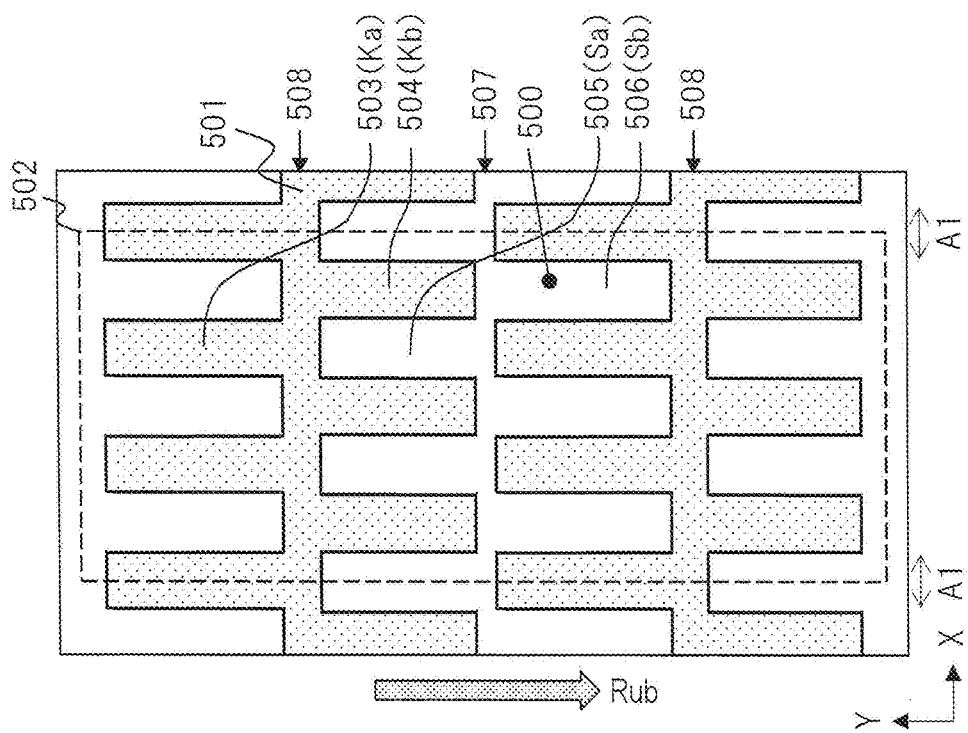
FIG. 4A is a diagram showing shapes of opening portions and electrodes of a pixel (configuration α) in the case of longitudinal slits.

FIGS. 4A and 4B show the configurations of electrodes, an opening portion, and the like of a pixel on an X-Y plane in the case of a configuration A and a configuration α shown in FIG. 9, and characteristics of a slit end portion or the like will be described. The configuration A shows a case where the upper electrode 31 is a common electrode COM and the lower electrode 32 is a pixel electrode PIX, and the configuration α shows a case of both-side comb-like shape. FIG. 4A shows a case provided with longitudinal slits, and FIG. 4B shows a case of the present embodiment where lateral slits (S) are provided.

In FIG. 4A, a reference numeral 501 denotes an electrode portion of the upper electrode (COM). A reference numeral 502 denotes a rectangular region of the lower electrode (PIX), which corresponds to a schematic pixel region. A reference numeral 500 denotes a region of an opening portion (slit) of a whole pixel formed by the upper and lower electrodes (501, 502), and it corresponds to a region outside the electrode portion 501. In this region, only a portion of the lower electrode (PIX) is present, and a portion of the upper electrode (COM) does not overlap the lower electrode. A reference numeral 503 (Ka) denotes a projecting portion (comb tooth) of the electrode portion 501 extending long in an upward direction, and a reference numeral 504 (Kb) denotes a projecting portion (comb tooth) extending long in a downward direction. In this case, each comb tooth has a rectangular shape. An individual slit (Sa, Sb) is formed by a pair of comb teeth adjacent to each other in the X direction. A reference numeral 508 denotes an electrode portion extending in the lateral (X) direction, which connects one ends of a plurality of projecting portions (Ka, Kb). In this manner, a both-side comb-like shape where comb teeth (Ka, Kb) alternately extend upward and downward from an axis (508) extending in the X direction is formed.

A reference numeral 505 (Sa) denotes an individual slit of the opening portion 500 extending long upward in the longitudinal (Y) direction, and a reference numeral 506 (Sb) denotes an individual slit of the opening portion 500 extending long downward in the longitudinal (Y) direction. A reference numeral 507 denotes a slit (also referred to as communication opening portion) extending in the lateral (X) direction, and it connects one ends of a plurality of slits (Sa, Sb). One end of each slit (Sa, Sb) is closed by the electrode portion 501, and the other end thereof is opened to communicate with the communication opening portion 507. In this manner, the both-side comb-like shape where slits (Sa, Sb) alternately extend upward and downward from an axis (507) extending in the X direction is formed.

A reference sign A1 denotes regions of left and right end portions of the opening portion 500 of a pixel in the X direction, and the end portion A1 demarcates the boundary between the regions having different characteristics as described above. In FIG. 4A, the rubbing direction (Rub) on the array substrate side is a direction parallel to the slit extending in the longitudinal (Y) direction (downward direction in FIG. 4A).

FIG. 4B approximately corresponds to a configuration where FIG. 4A is rotated in a counterclockwise direction by 90° (details of the pixel electrode and the like are omitted). A reference numeral 50A shows a region of an opening portion (slit) of a whole pixel formed by the upper and lower electrodes (31 (COM), 32 (PIX)) in the case of the configuration A, and it corresponds to a region outside the upper electrode 31. In this region, only a portion of the lower electrode 32 (PIX) is present, and a portion of the upper electrode 31 (COM) does not overlap the lower electrode. Note that the opening portion 50 (50A, 50B) does not mean a region of the pixel region effective for display but indicates a region where only the lower electrode 32 exists due to absence of the upper electrode 31 regarding the overlapping of the upper and lower electrodes (31, 32) in the plan view (X-Y). A reference numeral 53 (Ka) denotes a projecting portion (comb tooth) of the electrode (31) extending long in a leftward direction, and a reference numeral 54 (Kb) denotes a projecting portion (comb tooth) extending long in a rightward direction. An individual slit S (Sa, Sb) is formed by a pair of comb teeth adjacent to each other in the Y direction. A reference numeral 58 denotes the electrode portion of the upper electrode 31 extending in the longitudinal (Y) direction, which connects one ends of the plurality of projecting portions (Ka, Kb). More specifically, the upper electrode 31 (COM) has a both-side comb-like shape where the comb teeth (Ka, Kb) alternately project leftward and rightward from the axis (58) extending in the Y direction.

A reference numeral 55 (Sa) denotes an individual slit of the opening portion 50A extending long leftward in the X direction, and a reference numeral 56 (Sb) denotes an individual slit extending long rightward in the X direction. A reference numeral 57 denotes a slit (also referred to as communication opening portion) extending in the longitudinal (Y) direction, which connects one ends of a plurality of slits S (Sa, Sb) to form a continuous opening. One end portion of each slit S is closed by the electrode portion (31), and the other end portion thereof is opened to communicate with the communication opening portion 57.

In the opening portion 50A, a plurality of slits S disposed in a row in the Y direction and having the same X-directional positions have the same shape, and left and right end positions thereof are aligned, respectively, and they are arranged at constant pitches in the Y direction. A group of slits S in rows adjacent in the X direction forms a both-side comb-like shape where the slits S are alternately arranged leftward and rightward from the communication opening portion (longitudinal slit) 57 extending in the Y direction so as to be shifted in the Y direction. The length of the shift corresponds to ½ of the pitch of the slits S in the Y direction (see FIG. 23 described later). The both-side comb-like shape having alternately arranged teeth can also be referred to as a structure where the slits S and projecting portions (electrode portion) are arranged in a staggered manner.

A slit end SE indicates an outer side (line) of a slit positioned outermost in the Y direction (referred to as outermost slit) in the configuration of the opening (slits) 50 formed by the upper and lower electrodes (31, 32) of the pixel. In this case, the slit end SE corresponds to a side of the rectangle of the lower electrode 32 (PIX). An end portion (also referred to as "slit end portion") A1 is a region of upper and lower end portions in the Y direction of the opening portion 50A of the pixel, and it is a region including the line of the slit end SE as a center.

In FIG. 4B, the rubbing direction (Rub) on the array substrate 10 side is a direction parallel to the X direction (in a left-to-right direction in the drawing) so as to correspond to the structure of the slit S in the lateral (X) direction. Note that a reference sign L0 indicates a total length of the slits in the X direction of the opening portion 50A (including the widths of Sa, Sb, and 57). Reference signs L1 and L2 are lengths of the left and right slits (Sa, Sb), respectively.

In the case where the configuration of the upper and lower electrodes (31, 32) and the opening portion 50A shown in FIG. 4B is applied to the LCD, the characteristics such as the response speed are different between the pixel-inside region Q1 and a pixel end portion region Q2 demarcated by the boundary of A1 (SE) as described above. The region of Q1 is caused to have the above-described first characteristic with a high-speed responsiveness corresponding to the new system (the high-speed horizontal electric field mode). However, the region of Q2 is caused to have the above-described second characteristic (second characteristic with the response speed approximately equal to that of the conventional FFS system at an end portion of the slit). One of the reasons is because of the difference in shape and presence/absence of the upper and lower electrodes (31, 32). In detail, the region of Q2 is slower in response speed at the time of applying a voltage than the region of Q1, and Q2 is different from Q1 in luminance curve, orientation stability, and the like. Since the region of Q1 and the region of Q2 are different in initial orientation state from each other, there is a possibility that distortion on display occurs due to orientation abnormality in the region Q2.

Therefore, in the configuration of the present embodiment (first embodiment described later), the region Q2 demarcated by the boundary of the end portion A1 (slit end SE) of the pixel in the Y direction is overlapped with the BM 22 (particularly, lateral BM portion 22A) described later (FIG. 8 and others) disposed thereabove in the Z direction. In this manner, the region of Q2 is concealed to hide the second characteristic. More specifically, the pixel configuration where the second characteristic of the region of Q2 is hidden by the lateral BM portion 22A with a large width is adopted. As a result, the characteristics (the response speed, the luminance curve, the orientation stability, and the like) of the region of Q2 can be suppressed at each pixel, so that the overall characteristics can be uniformized to the characteristic of the region of Q1, and the display quality can be improved.

As shown in FIG. 4B, by adopting the configuration of the opening portion 50A having the slits S extending in the lateral (X) direction, light shielding for the region (Q2) of the end portion (A1) can be easily made by the lateral BM portion 22A with a large width as described later (FIG. 8), and an efficient pixel configuration can be realized. For example, it is possible to take a wide region effective for display of a pixel. By way of comparison, in the case where the regions at the left and right end portions (A1) are concealed by the longitudinal BM 22B in FIG. 4A, there is a demerit that it is impossible to take a wide region effective for display of the pixel and an inefficient pixel configuration is formed.

If the length L1 of the slit (Sa) is set to 0 in FIG. 4B, the one-side comb-like shape similar to the configuration β (FIG. 3) is obtained. Further, FIG. 4B shows the case where the opening portion 50A is not closed for each pixel and is continuously opened over the pixel line in the Y direction, but the opening portion 50A may be formed to have a shape closed for each pixel as described later. In any of the configurations, in terms of the shape of each pixel, the slit end portion A1 or the slit end SE occurs due to the existence of the rectangular pixel electrode PIX or the like, and the difference in characteristic occurs between regions positioned outside and inside it.

[Liquid Crystal Orientation]

The liquid crystal orientation of the liquid crystal layer 30 or the like in the system of the present embodiment will be described with reference to FIG. 5 to FIG. 7.

Figure 5:
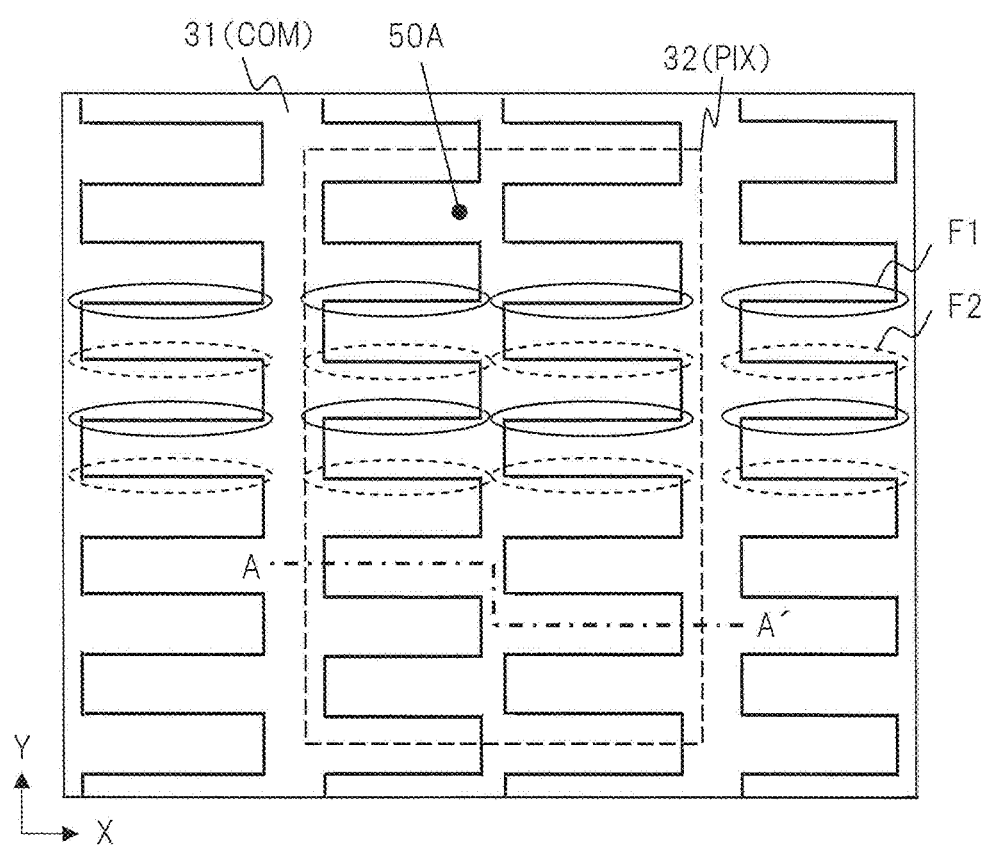
FIG. 5 is a diagram for describing a liquid crystal orientation and the like in this system (FIG. 4B)

FIG. 5 shows the configuration of the opening portion (slit) 50A in the same manner as FIG. 4B. In this both-side comb-like shape, neighboring regions (F1, F2) of long sides (one side and the other side of the slit S opposed to each other in the width direction) of respective slits S in the X direction are aligned approximately on the same X-directional lines. As rotation directions of liquid crystal molecules in the plane of the substrate (X, Y), there are two kinds of rotation directions shown by F1 (solid line) and F2 (broken line) in the regions (F1, F2) of the long sides of the slit S. The regions having the same rotation direction are aligned on the same X-directional line. In the Y direction, two kinds of regions (F1, F2) are arranged alternately. Since liquid crystal rotation directions are identical in the rows adjacent in the X direction and on the X-directional line, the orientation stability is high.

FIGS. 6A and 6B are a partially-enlarged views of FIG. 5 and show the regions (F1, F2) having two kinds of liquid crystal orientations. FIG. 6A corresponds to a voltage-OFF time and an initial orientation state, and FIG. 6B corresponds to a voltage-ON time. A reference numeral 701 denotes an image of a liquid crystal molecule. A reference sign F1 denotes a region where a twist or a rotation direction of liquid crystal is a clockwise direction in an X-Y plane, and a reference sign F2 denotes a region where the twist or the rotation direction is a counterclockwise direction. F1 and F2 denote neighboring regions around the two opposed long sides (long sides of corresponding projecting portions) of the slit S (Sa, Sb). For example, a certain left-side slit 55 (Sa) has an upper long side a1 and a lower long side a2. Also, a projecting portion 53 (Ka) positioned on the right side of the slit 55 (Sa) has an upper long side a3 and a lower long side a4. The long sides a1 and a3 are arranged approximately on the same X-directional line, and the long sides a2 and a4 are arranged approximately on the same X-directional line.

A short side at one end of the slit S is opened and connected to a longitudinal slit 57 and each long side of the slit S has a corner portion connected to the longitudinal slit 57. This corner portion has an electric field control function (in other words, function of stabilizing the liquid crystal orientation). More specifically, in a long side (for example, a1) of each slit S, the rotation direction of liquid crystal becomes the same (for example, F1) on a line extending from a corner portion at one end closed by the electrode portion (58) to a corner portion at the other opening end, so that the orientation is stabilized. This holds true for the left and right slits S (Sa, Sb) with respect to the communication opening portion 57 in the Y direction. For example, since the long side a3 of the slit Sb existing adjacent to the long side a1 of the slit Sa similarly has an electric field control function at the corner portion, the rotation direction of liquid crystal becomes the same (F1) also in the long side a3, so that the orientation is stabilized. Further, in the long sides (a2, a4) on the other sides of the slits S, the regions (F2) having rotation direction opposite to those of the long sides (a1, a3) on the one sides are formed, so that the orientation is stabilized.

In the state shown in FIG. 6A, respective liquid crystal molecules are oriented so that long axes thereof extend along the lateral (X) direction. The state is changed from the state shown in FIG. 6A to the state shown in FIG. 6B by the voltage application to the upper and lower electrodes (31, 32). At this time, as illustrated in the drawings, by the generated fringe electric field, the liquid crystal molecules stand up in the Z direction while rotating in respective directions (clockwise direction and counterclockwise direction) on the X-Y plane. The both rotation directions exist in a mixed manner in a region of the slit S between F1 and F2.

Also, in the state shown in FIG. 6B, orientation states of liquid crystal molecules are approximately identical on the X-directional line on the sides of each slit (for example, a1 to a4). Therefore, in this system, the response speed at the time of applying a voltage is fast (the response time is short), the orientation stability is high, and the display quality becomes high.

Figure 7A:
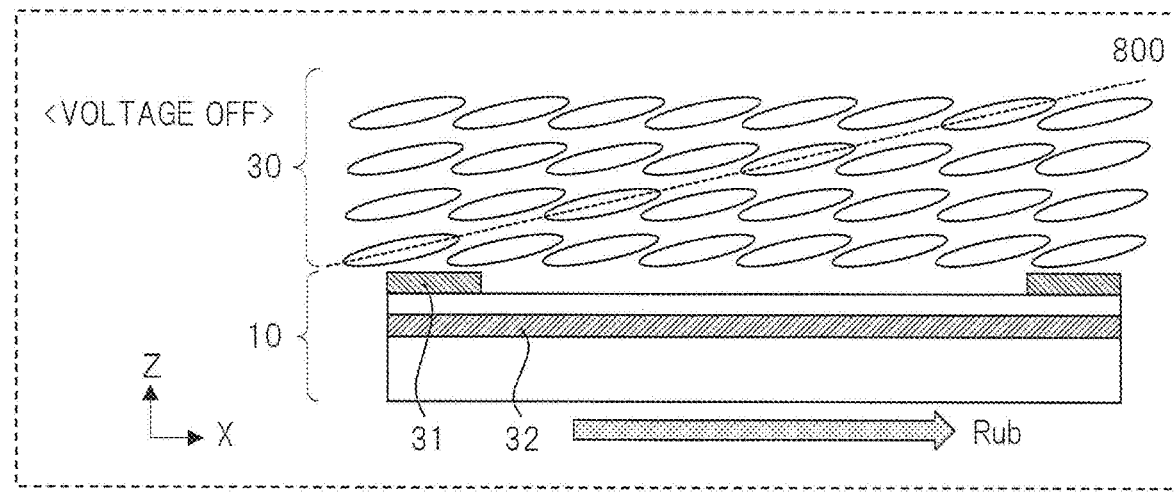
FIG. 7A is a diagram showing a cross section taken along line A-A' of FIG. 5 for describing liquid crystal orientation at the time of voltage-OFF.
Figure 7B:
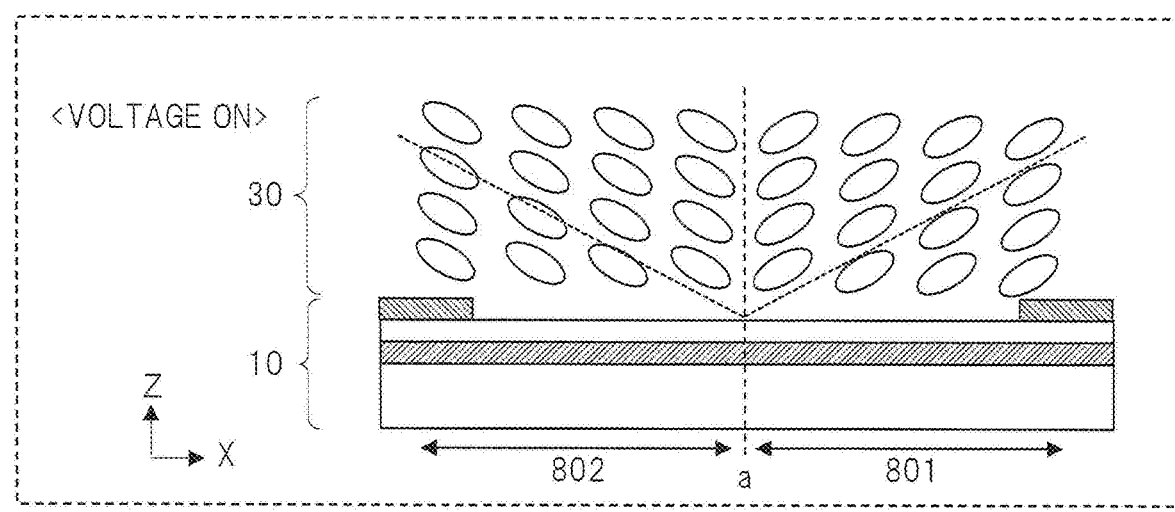

FIGS. 7A and 7B show liquid crystal orientation states in the Z direction in a cross section A-A' in FIG. 5. FIG. 7A corresponds to a voltage-OFF time and an initial orientation state, and FIG. 7B corresponds to a voltage-ON time. In FIG. 7A, liquid crystal molecules are initially oriented in a pre-tilt direction based on a predetermined pre-tilt angle in the manner indicated by a reference numeral 800 by the rubbing direction Rub (from left to right) on the array substrate 10. The liquid crystal molecules are oriented so that one end portions in a long axis corresponding to an advancing direction of the rubbing direction Rub (right side) rise slightly.

The orientation state is changed from the state shown in FIG. 7A to the state shown in FIG. 7B by the voltage application. At this time, the liquid crystal molecules stand up in the Z direction as shown in FIG. 7 while rotating in the plane (X, Y) as shown in FIG. 6. In FIG. 7B, a line "a" corresponds to the position of the communication opening portion 57 in a region above the slit S (Sa, Sb). On the right side (801) from the line "a", liquid crystal molecules stand up in a positive direction corresponding to the pre-tilt direction (800), and liquid crystal molecules stand up in the opposite direction on the left side (802). More specifically, the liquid crystal molecules are less likely to stand up on the left-side region (802) than on the right-side region (801), and the left-side region (802) is disadvantageous in responsiveness.

In order to respond to this, as shown in FIG. 4B, this system adopts the configuration in which the lengths (L1, L2) of the left and right slits (Sa, Sb) are made different in the opening portion 50A and the ratio of the portion of L1 is reduced by setting the relation therebetween to L1<L2. In this manner, the characteristic of the responsiveness can be improved.

[High-Speed Horizontal Electric Field Mode]

The high-speed horizontal electric field mode used in the liquid crystal panel 1 of the present embodiment will be described with reference to FIGS. 4A and 4B and the like. For example, in the case of the configuration A, the common electrode COM is provided over a whole screen across respective pixels in a planar shape, and a plurality of rectangular openings (slits S) having a long side with a predetermined length and a short side with a predetermined width are provided at positions facing the pixel electrodes PIX (FIG. 4B and the like). The plurality of openings (S) are arranged so that extension directions thereof are the same (in the X direction in FIG. 4B). In the present embodiment, at the time of voltage application, liquid crystal molecules in the liquid crystal layer 30 in the neighboring regions (F1 and F2 in FIG. 5 and FIG. 6) on one side and the other side of the long sides facing each other in the width direction (in the Y direction in FIG. 4B) of the opening (S) are oriented so as to be twisted by the rotations in the directions opposite to each other. In this manner, the characteristic of the response speed is improved.

The length of the above-described opening (S) is, for example, 10 to 60 μm, and it is preferably less than 40 μm. This is because the rotation direction of the liquid crystal molecules is stabilized easily when setting the length to less than 40 μm. The width of the above-described opening (S) is, for example, 2 to 5 μm, and the pitch of the opening (S) is, for example, 4 to 10 μm. In order to enhance the response speed, the width and the pitch of the opening (S) are preferably smaller (the characteristics taking into consideration will be described later with reference to FIG. 23 and the like).

A plurality of openings (S) arranged on the same line (longitudinal row in FIG. 4B) are formed in the same shape so that positions of both ends are aligned with each other, and in the lines positioned adjacent to each other, individual openings (S) are arranged so as to be shifted from each other. The magnitude of the shift is ½ of the pitch in the Y direction, for example, in FIG. 4B. With the alternate arrangement like this (in other words, the approximately staggered arrangement), liquid crystal molecules rotating in the same direction come close to each other between the openings (S) of the adjacent lines as shown in FIG. 5 and FIG. 6. The regions (F1, F2) having two kinds of rotation directions (right, left) are arranged approximately on the same lines, respectively. On the screen, lines of the regions (F1, F2) having two kinds of rotation directions are arranged alternately in the Y direction. The orientation on the screen is stabilized by this arrangement.

The above-described common electrode COM has the communication opening portion 57 which connects a plurality of openings (S) arranged adjacent to each other in a width direction on the same line (longitudinal row). The communication opening portion 57 connects a plurality of openings (S) arranged alternately on the adjacent lines so that short sides on respective one ends are opened. Two long sides opposed in the width direction in one opening (S) have corner portions closed by the electrode portion (58) at one ends and corner portions opened to the communication opening portion 57 at the other ends.

Two long sides opposed in the width direction in one opening (S) have two corner portions at intersection points with the communication opening portion 57. These corner portions have a function as an electric field control portion. The corner portion which is the electric field control portion makes rotation directions of liquid crystal molecules equal to each other and stabilizes the orientation in an extension direction of the long side of the opening (S) in the neighboring region from the corner portion closed at the one end to the corner portion opened at the other end. As described above, in the opening portion 50 having the comb-like shape with alternate teeth and provided with the communication opening portion 57, the corner portions serving as the electric field control portions are provided at the individual openings (S), thereby improving the orientation stability.

Although the configuration in which the communication opening portion 57 is not provided (for example, the configuration in which respective openings (S) are independently formed in an island form or the like) is possible, the manufacture is facilitated by providing the communication opening portion 57. In the case where the configuration in which the communication opening portion 57 is not provided is adopted, it is desirable to make the long side of the opening (S) relatively short in order to improve the orientation stability (for example, 20 μm or less).

Alignment films (first and second alignment films) are subjected to rubbing process of anti-parallel orientation in a direction approximately parallel to an extension direction (X direction) of respective openings (S) so as to orient liquid crystal molecules in the liquid crystal layer 30 in a predetermined direction corresponding to the above-described shapes of the electrode and the opening. More specifically, the rubbing process is performed so that the first alignment film is rubbed in the above-described rubbing direction Rub and the second alignment film is rubbed in the direction opposite thereto.

In this manner, the liquid crystal in the liquid crystal layer 30 is oriented so that long axes of liquid crystal molecules on the opening (S) face approximately in the same direction (X) on respective long sides of the opening (S) opposed to each other in the width direction in an initial orientation state before the voltage application as shown in FIG. 6A. As shown in FIG. 6B, at the time of applying a voltage, liquid crystal molecules in the neighboring regions (F1, F2) on one side and the other side of the long sides of the opening (S) opposed to each other in the width direction are rotated in the directions opposite to each other to be oriented. In the neighboring region (F1) on the one side of the long side of the opening (S), liquid crystal molecules are rotated in a clockwise direction to be oriented from the closed corner portion to the opened corner portion, and in the neighboring region (F2) on the other side, liquid crystal molecules are rotated in a counterclockwise direction to be oriented from the closed corner portion to the opened corner portion. Regarding the Z direction, the liquid crystal is correspondingly oriented so that long axes of liquid crystal molecules stand up from the state of FIG. 7A to the state of FIG. 7B. In the intermediate region between the long sides of the opening (S) opposed to each other, liquid crystal molecules rotating in the respective directions (left and right) exist in a mixed manner. As described above, the orientation of liquid crystal molecules in the liquid crystal layer 30 on the electrode layer (including the opening portion 50) of the upper and lower electrodes (31, 32) is controlled separately in the regions (F1, F2) of the respective rotation directions (left and right). Therefore, the response speed at the time of applying a voltage becomes fast.

[Pixel and BM Configuration]

Figure 8:
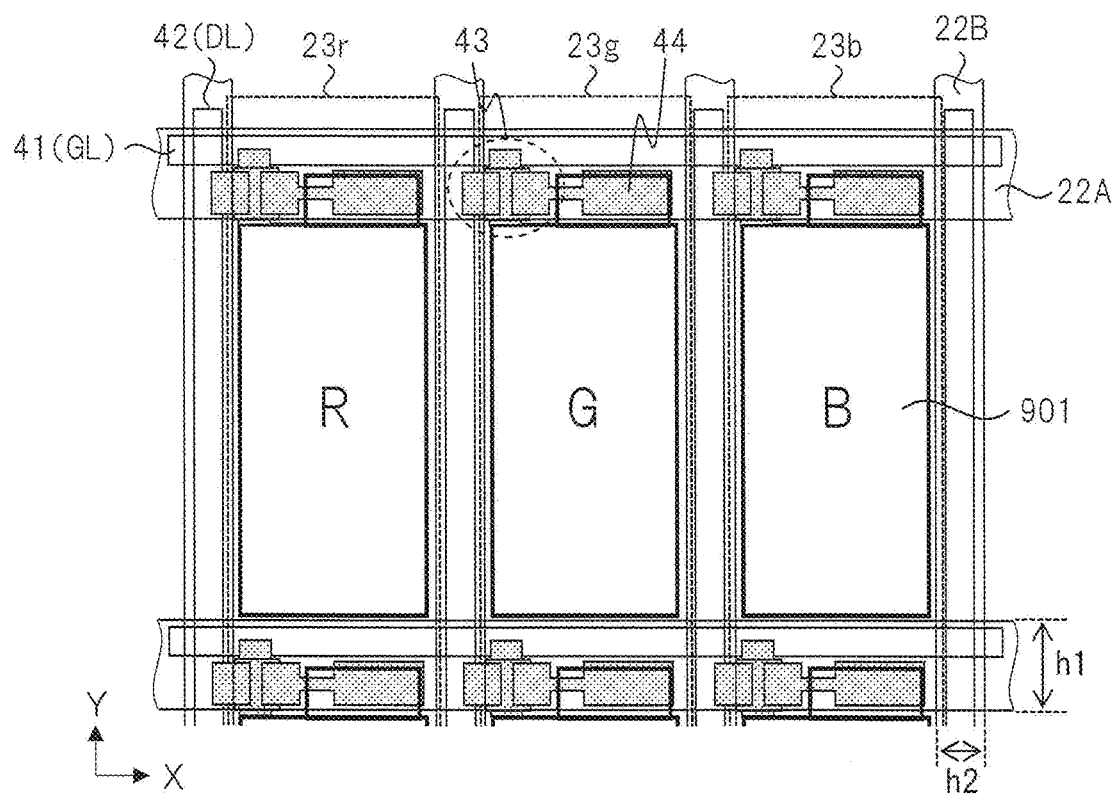
FIG. 8 is a diagram showing a planar configuration example of pixels, BM, and the like of a liquid crystal panel of the present embodiment.

Next, FIG. 8 shows a configuration example of pixels (also referred to as cell), the BM 22 and the like in an X-Y plane in the liquid crystal panel 1. Widths and the like of the BM 22 (22A, 22B) will be described. In the present embodiment, the BM 22 is composed of the lateral BM portion 22A extending in the X direction and the longitudinal BM portion 22B extending in the Y direction.

A region of a pixel (also referred to as sub-pixel) formed by the intersection between a gate line 41 (GL) parallel to the X direction and a data line 42 (DL) parallel to the Y direction is constituted on the array substrate 10 side. A reference numeral 901 denotes a schematic pixel region corresponding to a main pixel electrode PIX, in other words, a region of an opening of a pixel except for the BM 22 portion, and it has a longitudinally long rectangular shape in this case. FIG. 8 shows a case of a three-color stripe arrangement of RGB as a pixel arrangement. The CF 23 is a layer for performing color separation of transmitted light of the liquid crystal layer 30, and in this example, it is composed of layers 23r, 23g, and 23b which are layers separated into the colors of R (red), G (green), and B (blue) for each pixel line in the Y direction in accordance with the pixel design. Note that, as other pixel arrangements, a delta arrangement, a diagonal arrangement, a rectangle arrangement or the like is also possible. Further, the colors are not limited to three colors of RGB, but the configuration of one color, two colors, four colors or the like can be adopted.

A TFT portion 43 is disposed at a position (in this example, in the upper left of pixel) near the intersection between the gate line 41 and the data line 42. The TFT portion 43 includes a TFT element. The data line 42 is connected to a source terminal, the gate line 41 is connected to a gate terminal, and the pixel electrode PIX is connected to a drain terminal via a connection portion (referred to as contact receiver or the like) 44. A portion of the pixel electrode PIX is connected on the connection portion (contact receiver) 44 in an overlapping manner.

The BM 22 (22A, 22B) is disposed so as to conceal portions of the gate line 41, the data line 42, the TFT portion 43, and the like in a plan view (X-Y) in an overlapping manner. The lateral BM portion 22A is disposed on the gate line 41 and the TFT portion 43 in the X direction in an overlapping manner. The longitudinal BM portion 22B is disposed on the data line 42 in the Y direction in an overlapping manner. Therefore, the width (h1) of the lateral BM portion 22A is larger than the width (h2) of the longitudinal BM portion 22B (h1>h2). Particularly, BM 22 is configured to have different widths (22A, 22B) as described above because of the requirement of concealing the TFT portion 43 and the requirement of forming pixels (901) having the predetermined size, ratio, and the like.

In accordance with the configuration of the pixel and the BM 22 described above, in this system, as shown in FIG. 3 and FIG. 4, the opening portion 50 is configured to have the lateral (X)-directional slits S, and the upper and lower slit end portions in the Y direction (A1 in FIG. 4B and the like) of respective pixels are concealed by the lateral BM portion 22A having a larger width.

In the case of another pixel configuration, for example, in the structure where the longitudinal BM portion 22B is wider than the lateral BM portion 22A, the configuration in which the opening portion is formed to have longitudinal (Y)-directional slits and left and right slit end portions in the X direction of respective pixels are concealed by the longitudinal BM portion 22B can be correspondingly adopted.

[Configuration of Upper and Lower Electrodes]

Figure 9:
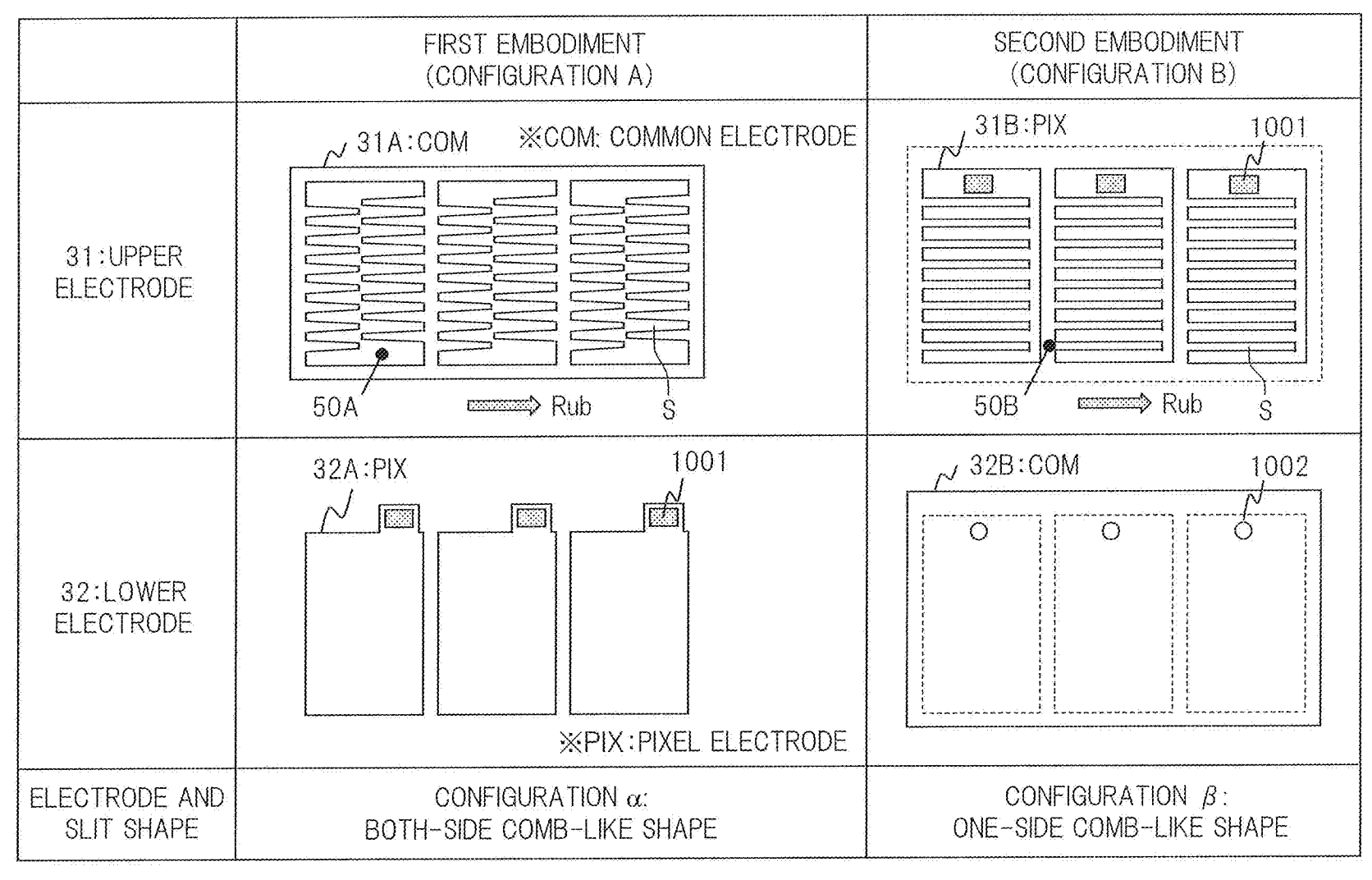

FIG. 9 collectively shows the configuration examples regarding the upper and lower electrodes (31, 32). FIG. 9 shows a schematic shape corresponding to three pixels of RGB. The rubbing direction Rub and the slit direction are the X direction. The first embodiment adopts the configuration A and the configuration α, and the second embodiment adopts the configuration B and the configuration β.

In the configuration A, the upper electrode 31 (31A) is the common electrode COM and the lower electrode 32 (32A) is the pixel electrode PIX. The upper electrode 31A (COM) is basically formed to be a solid layer over a whole surface region of a plurality of pixel regions and is provided with openings (50A) for each pixel. The lower electrode 32A (PIX) is formed to have a rectangular shape for each pixel, and the lower electrodes 32A are regularly arranged in a grid-like shape. A projecting portion (1001) constituting a connection portion with the contact receiver 44 is provided on an upper end side of the lower electrode 32A.

In the configuration B, the upper electrode 31 (31B) is the pixel electrode PIX, and the lower electrode 32 (32B) is the common electrode COM. The upper electrode 31B (PIX) is basically formed to have a rectangular shape and is provided with the slit (50B) for each pixel, and a connection portion (1001) with the contact receiver 44 is provided on an upper end side of the upper electrode 31B (PIX). The lower electrode 32B (COM) is formed to be a solid layer over a whole surface region of a plurality of pixel regions, and is provided with a conduction hole (1002) for each pixel so as to correspond to the position of the connection portion (1001).

Further, as the shape of the upper and lower electrodes (31, 32) and the slits (opening portions) 50, the configuration α adopts a both-side comb-like shape formed by the lateral (X)-directional slits S (particularly, trapezoid), and the configuration β adopts a one-side comb-like shape formed by the lateral (X)-directional slits S (particularly, rectangle). The configuration α (both-side comb-like shape) is shown in FIG. 4, FIG. 10, and the like. The configuration β (one-side comb-like shape) is shown in FIG. 3, FIG. 16, and the like.

The present invention is not limited to the aspects described above but various combinations can be adopted. For example, the shape of the opening of the upper electrode 31A (COM) of the configuration A may be changed to the one-side comb-like shape, and the shape of the upper electrode 31B (PIX) of the configuration B may be changed to the both-side comb-like shape. The shape of the comb tooth of the configuration α may be changed to a rectangle, and the shape of the comb tooth of the configuration β may be changed to a trapezoid.

First Embodiment

Next, the liquid crystal display device 100 and the liquid crystal panel 1 of the first embodiment will be described with reference to FIG. 10 to FIG. 15. The first embodiment adopts the configuration A (the upper electrode 31A is the common electrode COM and the lower electrode 32A is the pixel electrode PIX) and the configuration α (the both-side comb-like shape) as shown in FIG. 9.

[Configuration A, α-Plane]

FIG. 10 shows a structure of pixels, BM 22 and the like in the liquid crystal panel 1 (1A) of the first embodiment in an X-Y plane. FIG. 10 shows a portion corresponding to three pixels of RGB. This is the configuration where the electrode shape of the configuration α (FIG. 12, and the like) is applied to the configuration shown in FIG. 8. In particular, this is the configuration where the slit end portions in the Y direction of the opening portion 50A (at least a part thereof) are concealed by the lateral BM portion 22A with a large width (h1) in each pixel. The detail will be described in FIG. 12 and subsequent drawings.

The lower electrode 32A (the pixel electrode PIX) is connected to the contact receiver 44 at the projecting portion 1101 on an upper end side thereof. The opening portion 50A formed by the lower electrode 32A (PIX) and the upper electrode 31A (COM) has a both-side comb-like shape and schematically corresponds to that obtained by changing the rectangle shown in FIG. 4B to trapezoid. A plurality of lateral (X)-directional trapezoidal slits S formed by the upper electrode 31A (COM) are provided above a rectangular surface of the lower electrode 32A (PIX). A portion of a plane where the upper electrode 31A (COM) does not overlap the lower electrode 32A (PIX) constitutes the opening portion 50A.

In this system, the lateral BM portion 22A extending in a direction parallel to the direction (X) of the slits S of the opening portion 50A is larger in width than the longitudinal BM portion 22B extending in a direction perpendicular thereto (h1>h2). In other words, the direction of the slits S of the opening portion 50 is designed so as to conform with the direction (X) of the lateral BM portion 22A with a larger width (h1). Also, the slit end portions (A1, A2 in FIG. 12) of the opening portion (slits) 50A of each pixel are concealed by the lateral BM portion 22A with a larger width (h1). Accordingly, the second characteristic of the pixel end portion region Q2 as described above (FIG. 4B) is suppressed and the overall characteristics can be uniformized to the first characteristic of the pixel-inside region Q1. Note that the extension direction of the lateral BM portion 22A with respect to the X-directional slits S is not necessarily limited to the same direction, but it may be made oblique to a certain extent. For example, the direction may be made to conform with the inclination of the trapezoid of the slits S or the comb teeth.

[Configuration A—Cross Section]

Figure 11:
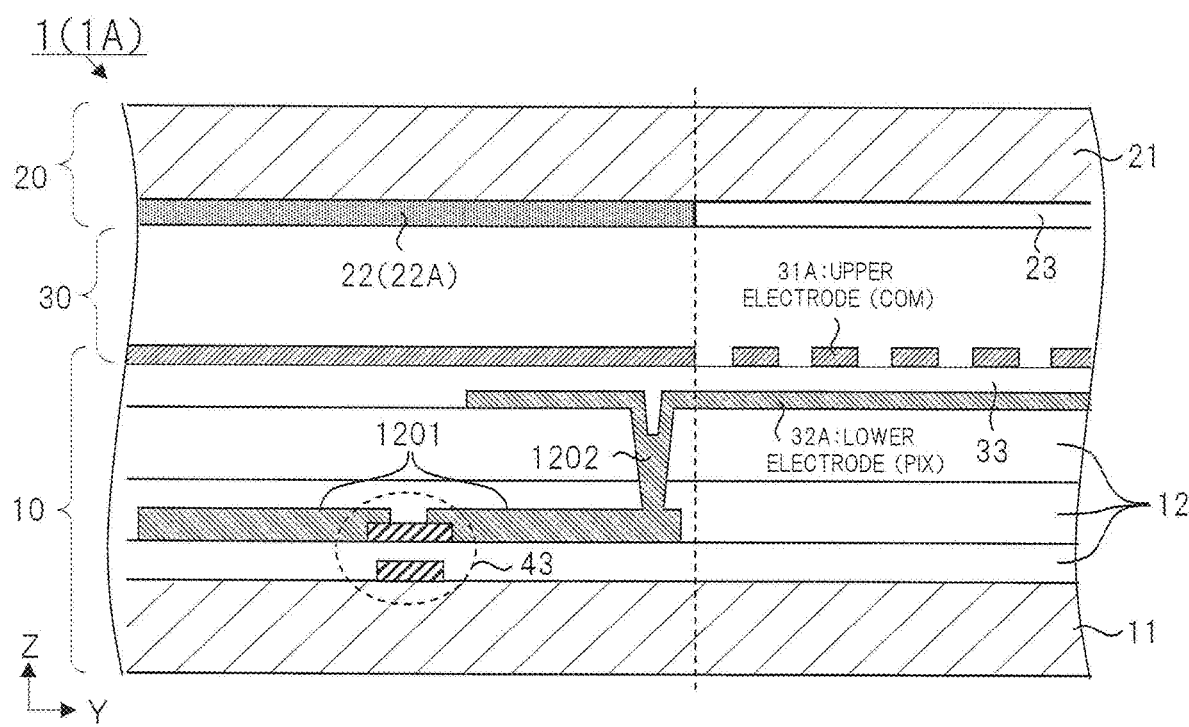
FIG. 11 is a diagram showing a cross-sectional structure of pixels of the display device (liquid crystal panel) of the first embodiment.

FIG. 11 shows an X-Z cross-sectional structure of pixels, BM 22, and the like of the liquid crystal panel 1 (1A) of the first embodiment. FIG. 11 corresponds to an A-A' cross section in FIG. 10. The array substrate 10 is made up of, for example, the gate line 41 (not shown), the data line 42 (1201), the TFT portion 43, the lower electrode 32A (PIX), the dielectric film 33 and the upper electrode 31A (COM) formed on the glass substrate 11 in this order from below and other insulating films 12. A layer for the lower electrode 32A (PIX) is formed on a layer planarized by the insulating film 12, and a layer for the upper electrode 31A (COM) is formed on the planarized dielectric film 33. A surface of the common electrode COM and a surface of the pixel electrode PIX are opposed in parallel with each other via the dielectric film 33.

The TFT portion 43 is composed of a TFT element including a gate electrode, a gate insulating film, a semiconductor film, and source/drain electrodes. A reference numeral 1201 denotes a data line 42 connected to a terminal of the TFT portion 43 or a line of the pixel electrode PIX connected thereto. A reference numeral 1202 denotes a conduction portion of the upper and lower layers (1201, 32A) in the Z direction. Note that the TFT element may be of a bottom gate type or of a top gate type. The semiconductor film may be made of any of amorphous silicon, oxide semiconductor, and organic semiconductor.

[Light-Shielding Configuration Example (1)]

FIG. 12 shows a first light-shielding configuration example by the lateral BM portion 22A corresponding to only one pixel in FIG. 10. In the slits (opening portion) 50A of a pixel, regions A1 and A2 corresponding to the Y-directional upper and lower slit end portions are provided. A reference sign SE denotes a slit end. In the first light-shielding configuration example, a region including an upper-side projecting portion 1101 positioned on the upper side of the SE line of the upper-side slit end portion A1 is concealed by the lateral BM portion 22A. A lower-side slit end portion A2 positioned on the lower side of another SE line is similarly concealed by the lateral BM portion 22A. The width h1 of the lateral BM portion 22A is particularly defined as h1a. A corresponding effect can be obtained even in the configuration where only one end portion of the upper and lower slit end portions in the Y direction is concealed.

The projecting portions which are individual comb teeth and the individual slits S have a trapezoidal shape. Reference signs K1 and K2 denote upper left and right outermost comb teeth in the Y direction. In the trapezoid of the comb teeth, a short upper side is provided on the inner side of the pixel, and a long lower side is provided on the outer side of the pixel. A reference sign Sa1 denotes a left-side outermost slit (except for Sw) on an upper side in the Y direction, and a reference sign Sb1 denotes a right-side outermost slit (except for Sw). The reference sign Sw denotes an outermost large slit on an upper side in the Y direction of the opening portion 50 (in other words, a large slit positioned outside the comb teeth K1 and K2). Slits Sa1 and Sb1 and those positioned below them have the same shape. In the trapezoid of the slit S, a long lower side is provided on the inner side of the pixel, and a short upper side is provided on the outer side of the pixel.

The width h1 (h1a) of the lateral BM portion 22A is made to be equal to or more than a width (width H described later) of a predetermined distance ranging from the slit end SE of the pixel to the outside. More specifically, the width h1 of the lateral BM portion 22A has a size capable of concealing the gate line 41 and the TFT portion 44 and also concealing at least a region of the width (H) of the predetermined distance ranging from the slit end SE to the outside. A configuration where the width h1 is made larger (FIG. 13 and subsequent drawings) can also be adopted. Since the slit end portion A1 and the like are correspondingly concealed, the aperture ratio of the pixel is slightly reduced, but the influence of the second characteristic of the pixel end portion region Q2 can be reduced, and uniformity of the characteristic of the pixel can be improved.

Light-Shielding Configuration Example (2)

Figure 13:
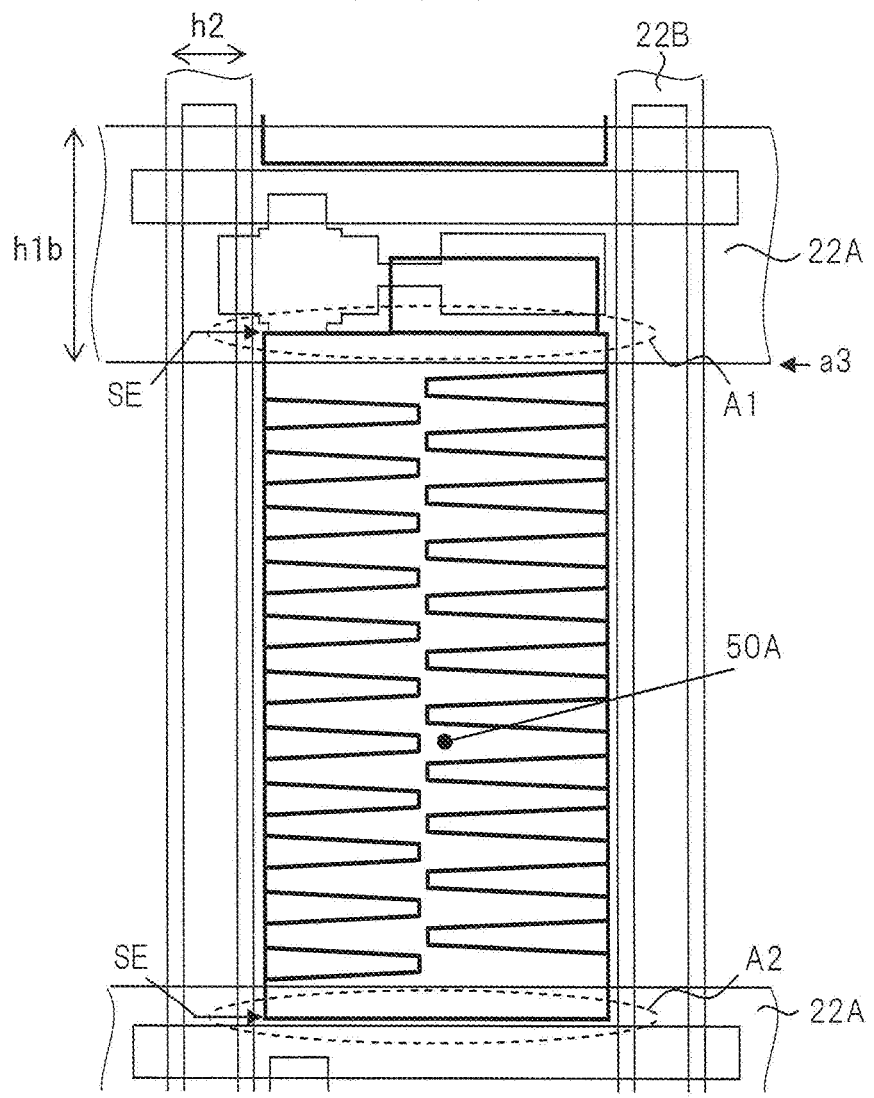
FIG. 13 is a diagram showing a second light-shielding configuration example in the first embodiment.

FIG. 13 shows a second light-shielding configuration example. In this configuration, the width h1 of the lateral BM portion 22A is made larger (h1b) than that in the configuration shown in FIG. 12, and the slit end portions A1 and the like are more concealed. The width h1b (lower side) of the lateral BM portion 22A reaches a little inner position from the upper-side slit end SE (a3 in FIG. 15). This position is near the outermost slit Sw (slightly outside the right-side outermost comb tooth K1). Similarly, for the lower-side slit end portion A2, a region ranging from the slit end SE to a predetermined slightly inner position is concealed.

Light-Shielding Configuration Example (3)

Figure 14:
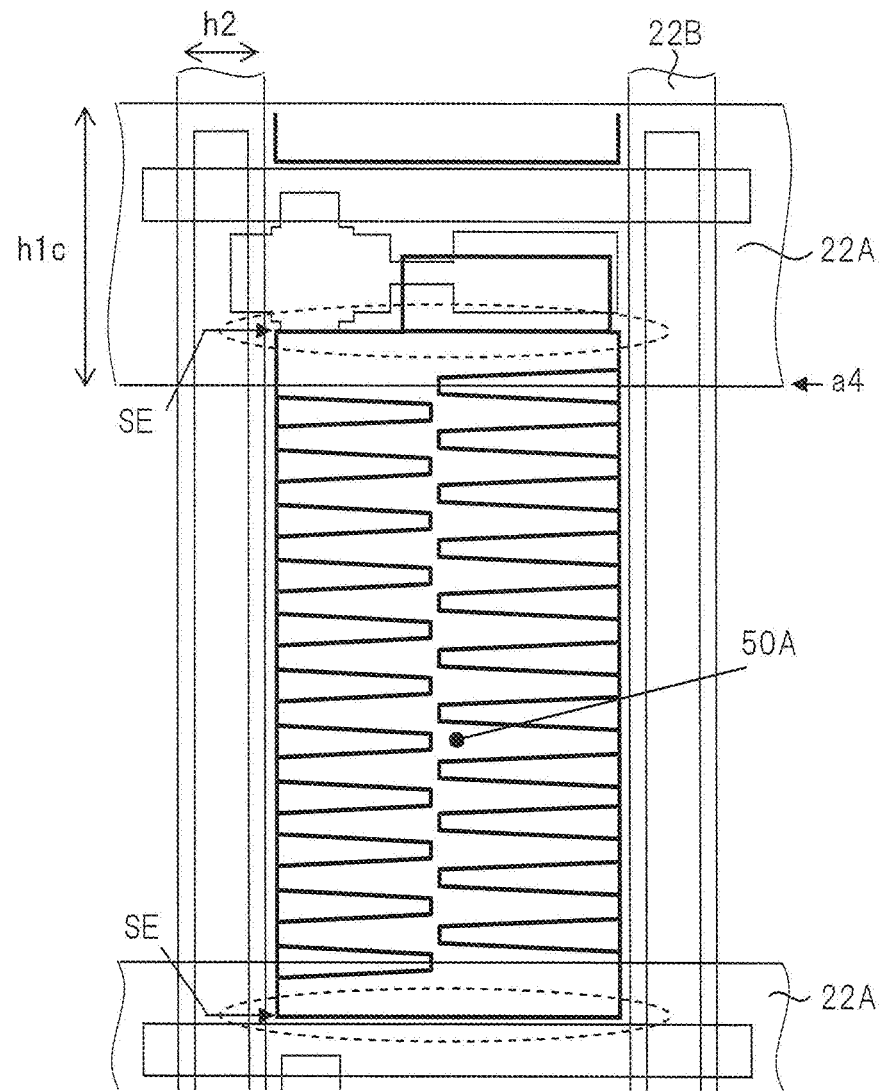
FIG. 14 is a diagram showing a third light-shielding configuration example in the first embodiment.

FIG. 14 shows a third light-shielding configuration example. In this configuration, the width h1 of the lateral BM portion 22A is further made larger (h1c), and the slit end portions A1 and the like are still more concealed. The width h1c (lower side) of the lateral BM portion 22A reaches an inner position from the upper-side slit end SE (a4 in FIG. 15). This position is near the center line of the right-side outermost comb tooth K1 (slightly outside the left-side outermost comb tooth K2). Similarly, for the lower-side slit end portion A2, a region ranging from the slit end SE to a predetermined inner position is concealed.

Note that the configuration where the outermost opening (Sw) portion is made small by moving the Y-directional position of the comb tooth (projecting portion) may be adopted.

[Complement]

Figure 15:
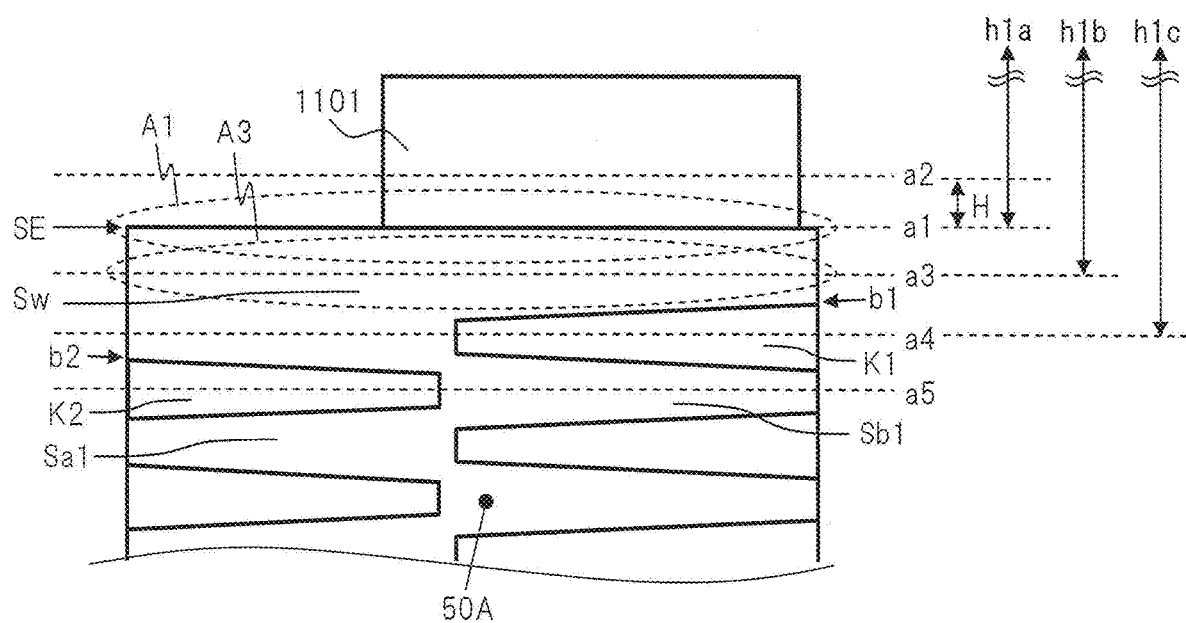
FIG. 15 is a diagram showing the region near a slit end of a pixel and the like in the first embodiment.

FIG. 15 shows complement regarding the configuration examples of the slit end SE and the light-shielding structure in the case of the above-described opening portion 50A. A reference sign A1 denotes a region of a slit end portion including a slit end SE in its center. A reference sign A3 denotes a region near the outermost slit Sw. An effect of hiding the second characteristic of the pixel end portion region Q2 (the response speed, the luminance curve, the orientation stability, and the like) can be obtained by concealing at least a region ranging in a predetermined width H (a2) from the slit end SE (a1) by the BM 22. Since the lateral BM portion 22A as shown in FIG. 8 exists, the width h1 of the lateral BM portion 22A is set to the width h1a including the width H and the like in accordance with that. In this manner, In this manner, an efficient pixel configuration including the BM 22 can be achieved, and the characteristics of the pixel can be uniformized and improved.

Second Embodiment

Next, a liquid crystal display device 100 and a liquid crystal panel 1 of the second embodiment will be described with reference to FIG. 16 to FIG. 19. The second embodiment adopts the configuration B (the upper electrode 31B is the pixel electrode PIX and the lower electrode 32B is the common electrode COM) and the configuration β (the one-side comb-like shape) as shown in FIG. 9.

[Configurations B, β-Plane]

FIG. 16 shows a structure of pixels, BM 22, and the like of the liquid crystal panel 1 (1B) of the second embodiment in an X-Y plane. FIG. 16 shows a portion corresponding to three pixels of RGB. This is the configuration where an electrode shape (FIG. 18, and the like) of the configuration β is applied to the configuration shown in FIG. 8. In particular, this is the configuration where the slit end portions in the Y direction of the opening portion 50B (at least a part thereof) are concealed by the lateral BM portion 22A with a large width (h1) in each pixel.

The lower electrode 32B (COM) is an electrode composed of a solid layer over a whole surface. The upper electrode 31B (PIX) is basically formed to have a rectangular shape for each pixel and is provided with rectangular slits S on its left side. A plurality of slits S formed by a plurality of rectangular projecting portions (comb teeth) in the lateral (X) direction of the upper electrode 31B (PIX) are provided above a surface of the lower electrode 32B (COM). The upper electrode 31B (PIX) is connected to the contact receiver 44 extending from the TFT portion 43 at a portion (connection portion 1001) on an upper side thereof. A portion of a plane where the upper electrode 31B (PIX) does not overlap the lower electrode 32B (COM) constitutes the opening portion 50B.

In this system, like the case of FIG. 10 (first embodiment), the slit end portions (A1, A2 in FIG. 18) in the Y direction of the opening portion (slits) 50B are concealed by the lateral BM portion 22A with a large width (h1) in each pixel. Accordingly, the second characteristic of the pixel end portion region R2 as described above (FIG. 3B) is suppressed and the overall characteristics can be uniformized to the first characteristic of the pixel-inside region R1.

[Configuration B—Cross Section]

Figure 17:
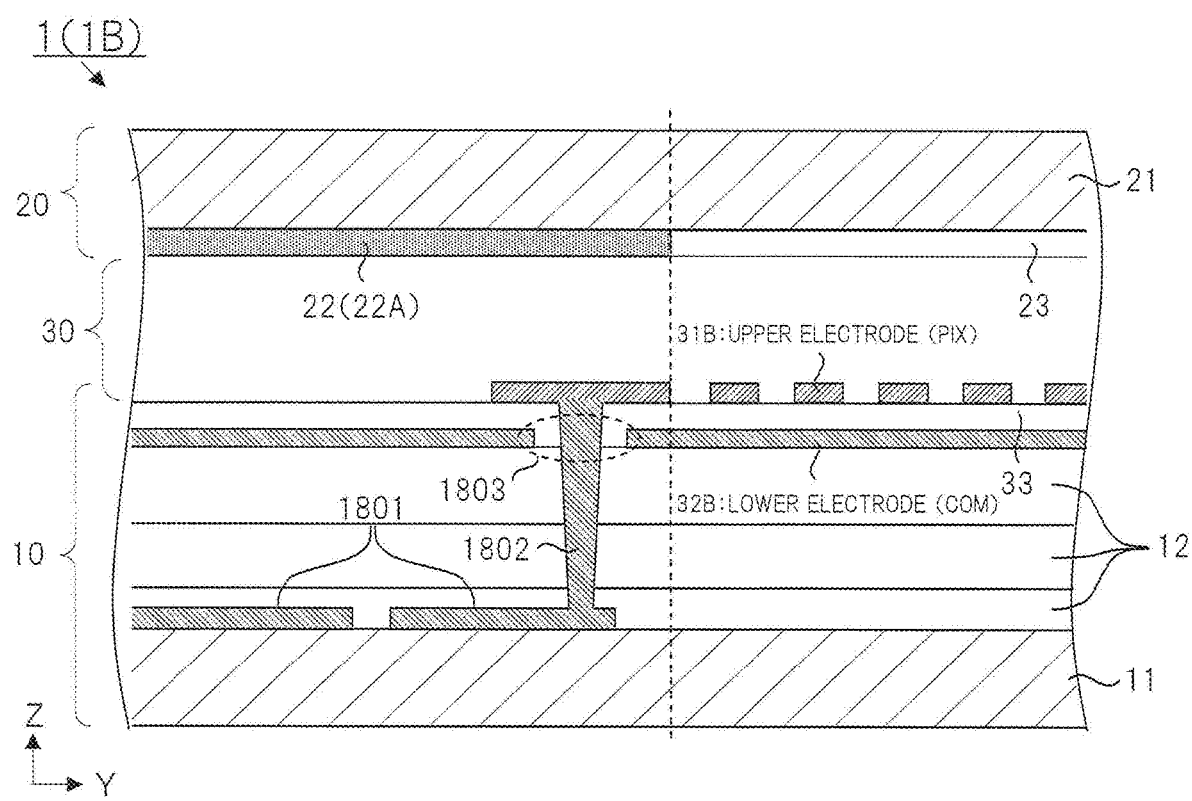
FIG. 17 is a diagram showing a cross-sectional structure of pixels of the display device (liquid crystal panel) of the second embodiment.

FIG. 17 shows an X-Z cross-sectional structure of pixels, BM 22, and the like of the liquid crystal panel 1 (1B) of the second embodiment. FIG. 17 corresponds to a B-B' cross section in FIG. 16. The array substrate 10 is made up of, for example, the gate line 41 (not shown), the data line 42 (1801), the TFT portion 43 (not shown), the lower electrode 32B (COM), the dielectric film 33 and the upper electrode 31B (PIX) formed on the glass substrate 11 in this order from below and other insulating films 12. A layer for the lower electrode 32B (COM) is formed on a layer planarized by the insulating film 12, and a layer for the upper electrode 31B (PIX) is formed on the planarized dielectric film 33.

A reference numeral 1801 denotes a data line 42 connected to a terminal of the TFT portion 43 and a line of the pixel electrode PIX connected thereto. A reference numeral 1802 denotes a conduction portion of the upper and lower layers (1801, 31B) in the Z direction. A reference numeral 1803 denotes a portion of a conduction hole (1002) provided in the lower electrode 32B (COM).

[Light-Shielding Configuration Example]

Figure 18:
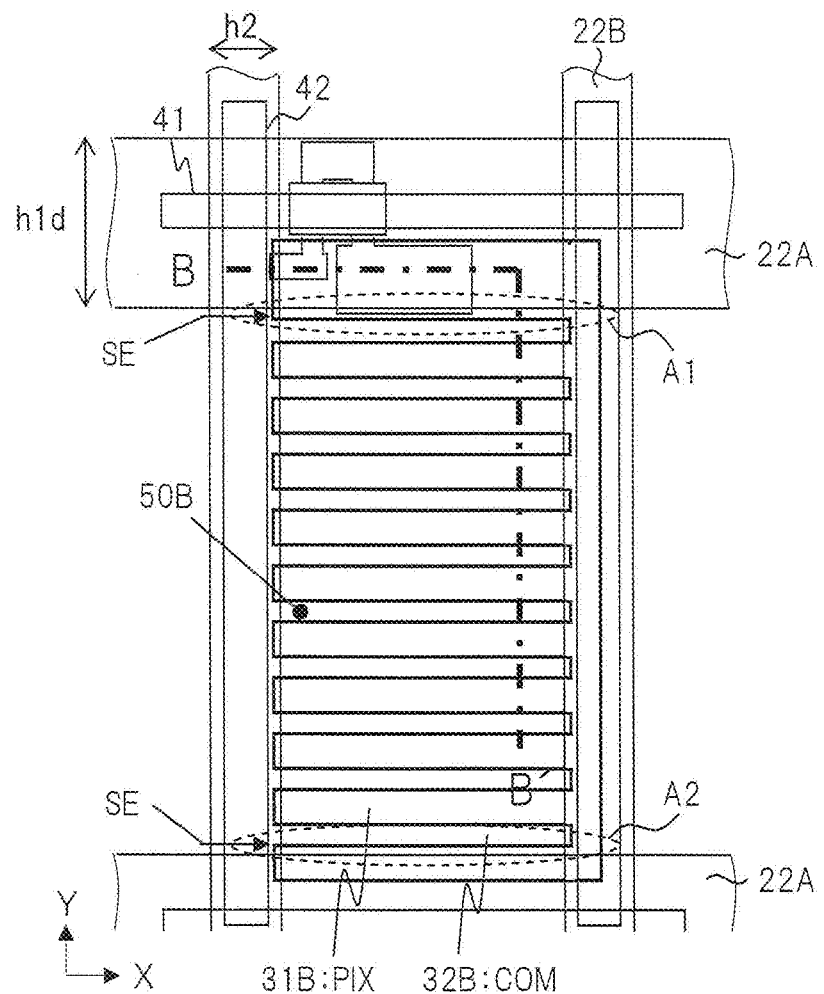
FIG. 18 is a diagram showing a light-shielding configuration example in the second embodiment.

FIG. 18 shows a light-shielding configuration example by the lateral BM portion 22A corresponding to only one pixel in FIG. 16. The shape of the pixel electrode PIX and the like are similar to those shown in FIG. 3B. In the slits (opening portion) 50B of a pixel, regions A1 and A2 corresponding to the Y-directional upper and lower slit end portions are provided. A reference sign SE denotes a line of a slit end. In this light-shielding configuration example, a region including the projecting portion Ew described above on the upper side of the SE line of the upper-side slit end portion A1 is concealed by the lateral BM portion 22A. Similarly, for the lower-side slit end portion A2, a region on the lower side of the SE line is concealed by the lateral BM portion 22A. The width h1 of the lateral BM portion 22A is particularly defined as h1d. A corresponding effect can be obtained even in the configuration where only one end portion of the upper and lower slit end portions in the Y direction is concealed.

[Complement]

Figure 19:
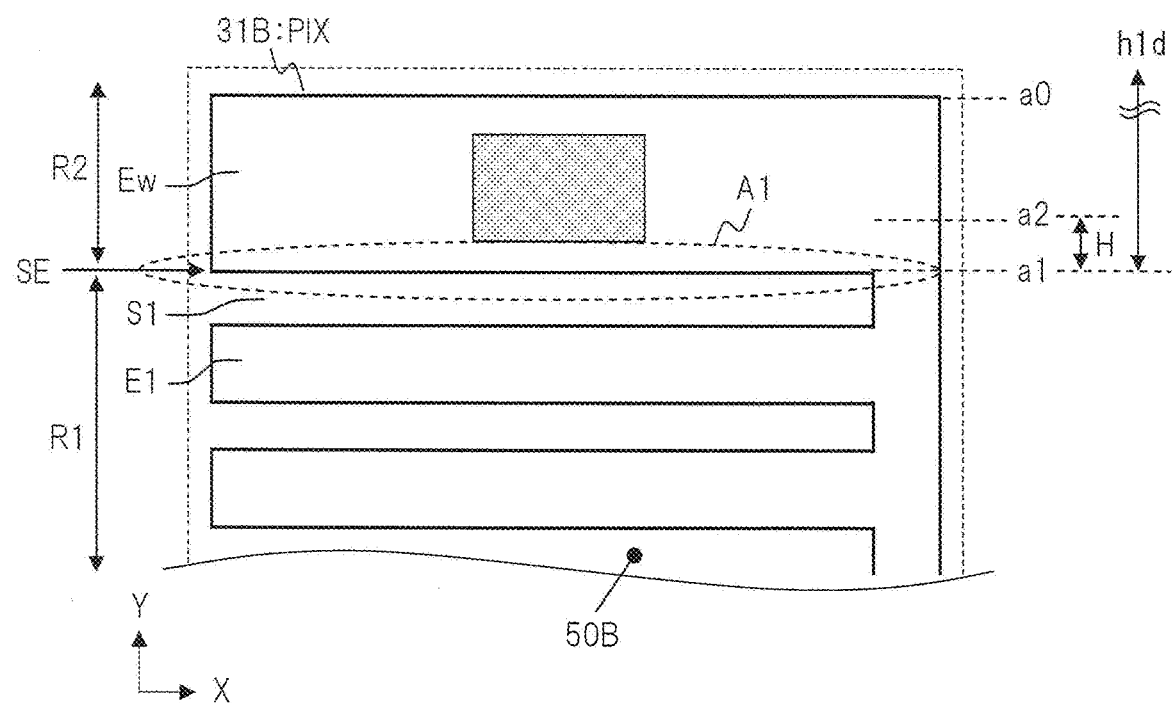
FIG. 19 is a diagram showing the region near a slit end of a pixel and the like in the second embodiment.

FIG. 19 shows complement regarding the configuration examples of the slit end SE and the light-shielding structure in the case of the above-described opening portion 50B. This complement has the contents corresponding to the case shown in FIG. 3. A reference sign Ew denotes a wide projecting portion at an upper end portion of the pixel electrode PIX, and this portion has a connection portion 1001. A reference sign E1 denotes a projecting portion which is an outermost comb tooth (except for Ew) in the Y direction. A reference sign S1 denotes an outermost slit in the Y direction. A reference sign a0 denotes a side of an end portion of the pixel electrode PIX. A reference sign a1 denotes a slit end SE. An effect of hiding the second characteristic of the pixel end portion region R2 (the response speed, the luminance curve, the orientation stability, and the like) can be obtained by concealing at least a region ranging in a predetermined width H (a2) from the slit end SE (a1) by the BM 22. Since the lateral BM portion 22A as shown in FIG. 8 exists, the width of the lateral BM portion 22A is set to the width h1d including the width H in accordance with that. In this manner, an efficient pixel configuration including the BM 22 can be achieved, and the characteristics of the pixel can be uniformized and improved. In addition, a configuration where the width (h1) of the light shielding is made larger can be adopted like the case of the first embodiment.

[Characteristics]

Next, characteristics, conditions, specific values, and the like for the design of a preferred pixel (cell) in the system of the liquid crystal display device 100 of the above-described embodiment will be described with reference to FIG. 20 to FIG. 30. Note that representative characteristics are collectively shown in FIG. 30. The description will be made for the case of the first embodiment, but it can be similarly applied to the second embodiment.

[Characteristic (1)—Light-Shielding Width]

The characteristic of the width (h1) of the above-described BM 22 (the lateral BM portion 22A) for concealing the region around the slit end portions of the pixel will be described with reference to FIG. 20 to FIG. 22. As the condition of the above-described minimum light-shielding width H (the predetermined distance from the slit end SE to the outside), H cell thickness d×5/3 μm and h1>H are established.

Figure 20:
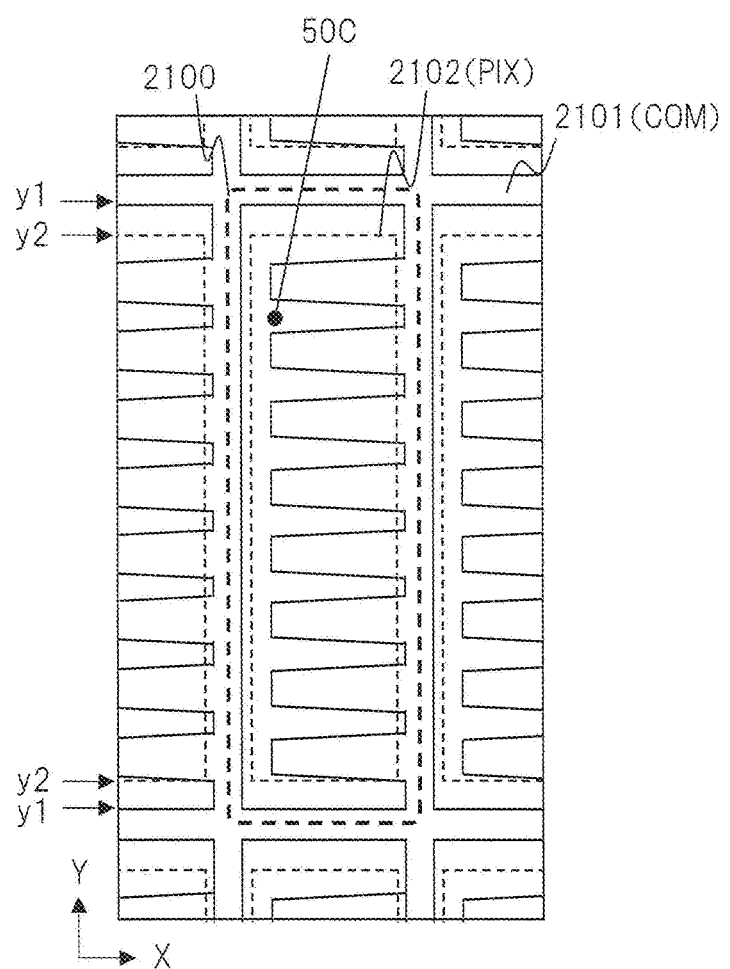
FIG. 20 is a diagram showing a pixel configuration example for simulation regarding a first characteristic (light shielding width)

FIG. 20 shows a pixel configuration example (defined as configuration C) to be a model for simulating/calculating the light-shielding conditions. In the configuration C, the upper electrode is the common electrode COM, the lower electrode is the pixel electrode PIX, the one-side comb-like shape is adopted, and the slit and comb tooth have a trapezoidal shape. A reference numeral 2100 denotes a schematic pixel region, a reference numeral 2101 denotes an electrode portion (COM), a reference numeral 2102 denotes a rectangle of the pixel electrode PIX on the back face side, and a reference numeral 50C denotes an opening portion (slits). A reference sign y1 denotes a pixel end portion in the Y direction (end portion of an opening of the opening portion 50C) and a reference sign y2 denotes a side of the pixel electrode PIX, namely, a line corresponding to the above-described slit end SE. Note that the conditions for the configurations A and B and the like can be easily developed based on the simulation calculation result of this configuration C.

Figure 21:
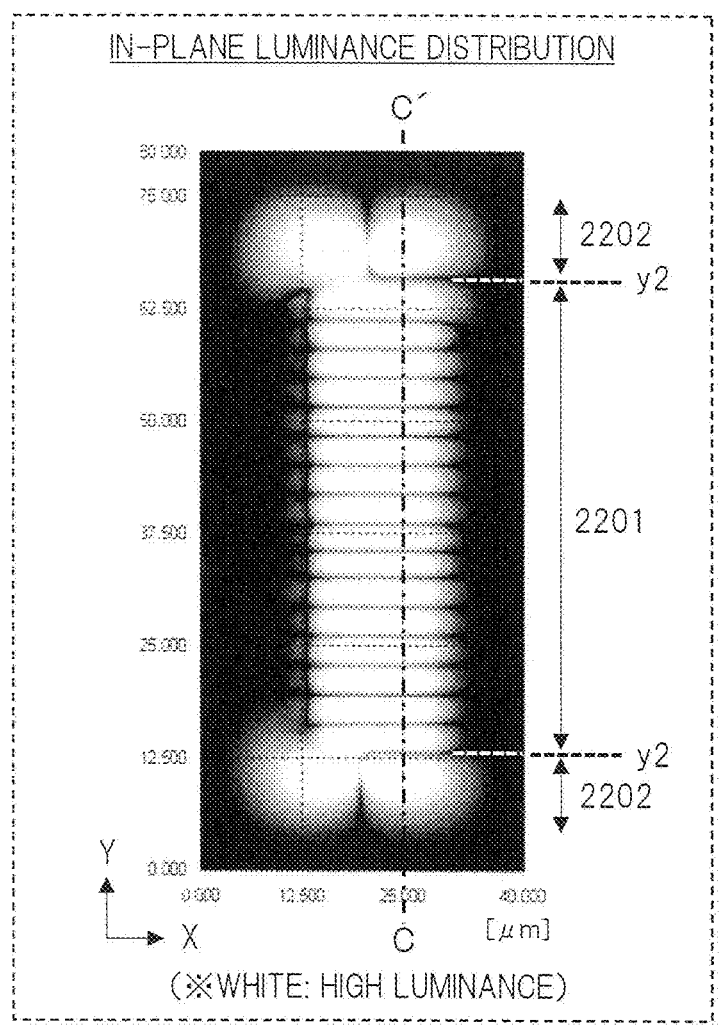
FIG. 21 is a diagram showing an in-plane luminance distribution of the simulation result regarding the first characteristic.

FIG. 21 shows the result obtained by calculating an in-plane luminance distribution based on the model (configuration C) shown in FIG. 20. A white color indicates that the luminance is high. As illustrated, in a region 2201 (corresponding to R1, Q1 described above) on an inner side from the slit end portion (y2), laterally elongated regions with the luminance (white) corresponding to respective slits S are longitudinally arranged orderly, the uniformity thereof is high and the distortion on display does not occur. On the other hand, in a region 2202 (corresponding to the R2, Q2 described above) on an outer side from the slit end portion (y2), the characteristic is different from that of the region 2201, and the uniformity is low.

Figure 22:
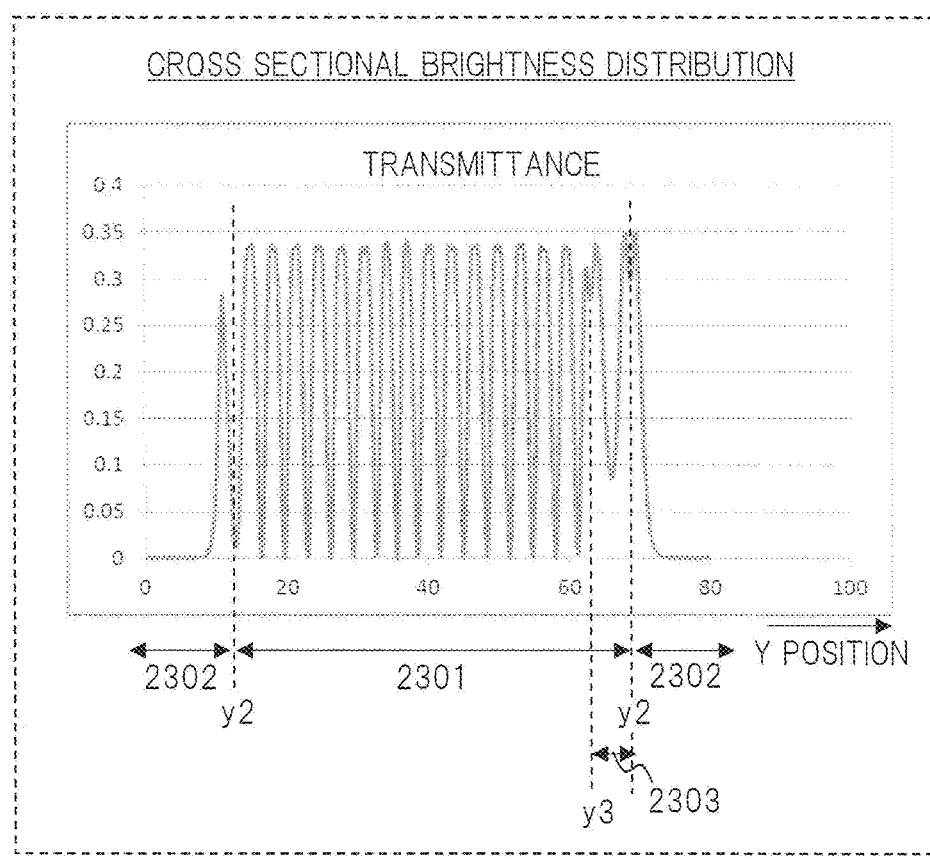
FIG. 22 is a diagram showing a cross-sectional brightness distribution of the simulation result regarding the first characteristic.

FIG. 22 shows a brightness distribution in C-C' cross section in FIG. 21. The brightness is shown by the shape of a distribution of transmittance in accordance with the Y-directional position. As illustrated, in a range 2301 positioned inside the slit end portion (y2), the distribution of an approximately uniform brightness (transmittance) can be obtained. In a range 2302 positioned outside y2, the brightness (transmittance) is degraded. Therefore, a configuration where the range 2302 positioned outside y2 is also concealed by the BM 22 is adopted. Furthermore, since the degradation or fluctuation of the brightness appears in the range 2303 from y3 to y2, the configuration where the range 2303 is also concealed by the BM 22 may be adopted.

Based on the results described above, it is desirable that a portion ranging in a certain distance from the slit end SE in the Y direction of the pixel is concealed by the BM 22. This distance is defined as the width H. The width h1 of the lateral BM portion 22A is set to be larger than the width H (h1>H). The cell thickness is defined as d (FIG. 27). The region in which the brightness spreads (region outside y2) is proportional to the cell thickness d. It is desirable that the width H is set to d×5/3 μm or more from the slit end SE. For example, in the case where d is 3.0 μm, H d×5/3 μm=5 μm is obtained.

[Characteristic (2)—Slit Pitch]

Figure 23:
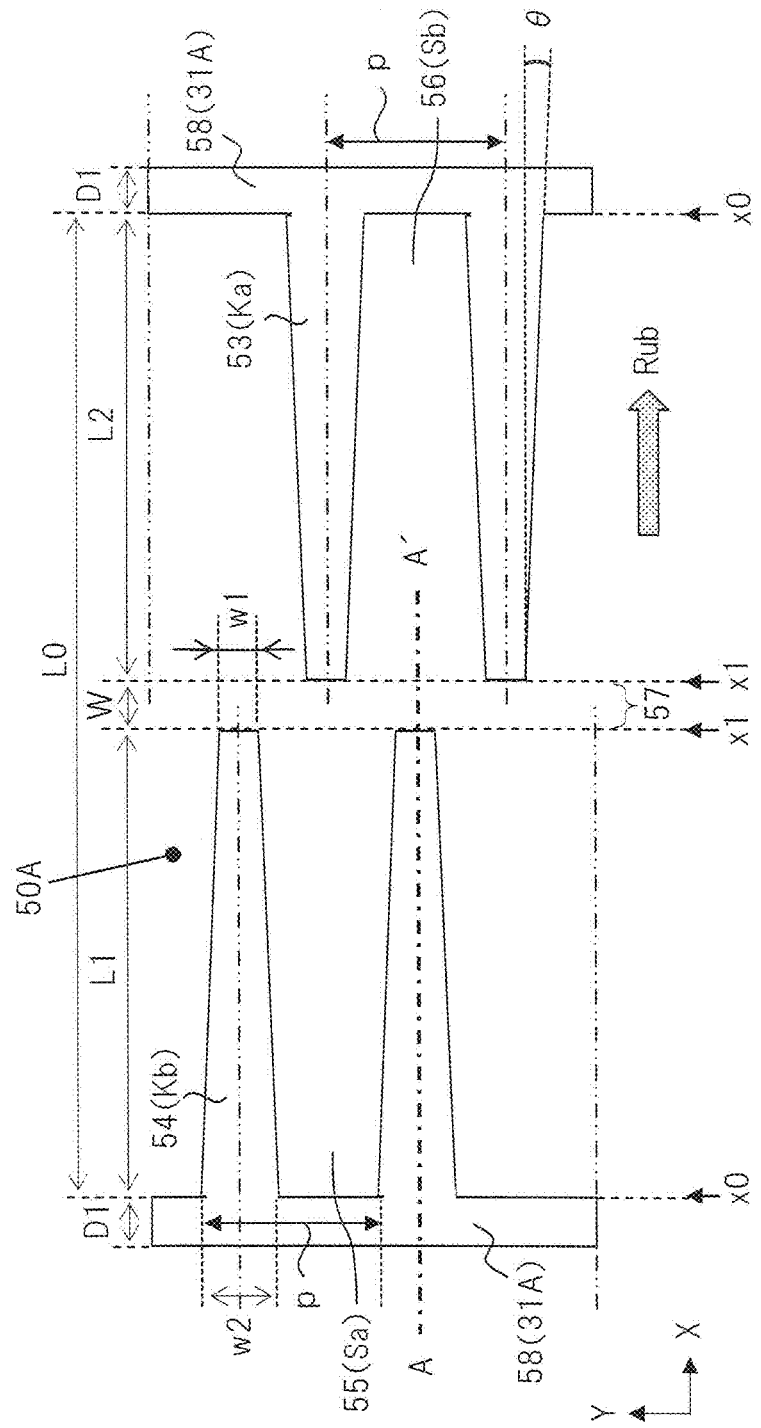
FIG. 23 is a partially-enlarged diagram showing an opening portion regarding the second to fourth characteristics.

The characteristic of the pitch (p) of the slit S in the shapes of the upper and lower electrodes (31, 32) or the like will be described with reference to FIG. 23 and FIG. 24. FIG. 23 shows the opening portion 50A of configurations A and a in a partially-enlarged manner. First, the total slit length L0 in the X direction is, for example, 10 to 60 μm, in particular, less than 40 μm, preferably, 20 μm. In the case where L0 is made short, the orientation stability of liquid crystal becomes high. On the contrary, in the case where L0 is made long, the luminance becomes high. Regarding slit lengths L1 and L2 of left and right slits S (Sa, Sb), L1<L2 is preferable in conformity with the rubbing direction Rub as described above (L1=L2 in FIG. 23). The width of a short side of the slit S (p−w2) is set to, for example, 2 to 5 μm, and the response speed becomes high as the width becomes short.

A reference sign p denotes a Y-directional pitch of a plurality of slits S. A reference sign W denotes an X-directional width of a longitudinal slit (communication opening portion) 57. A reference sign D1 denotes an X-directional width of a longitudinal electrode portion (58). A reference sign w1 denotes an upper-side width of trapezoids of comb teeth (projecting portions) ka and kb, and a reference sign w2 denotes a lower-side width thereof. A reference sign x0 denotes an X-directional position of an upper side on the one closed end side of the slit S, a lower side of the comb tooth, and both sides of the electrode portion (58), and a reference sign x1 denotes an X-directional position of a lower side on the other opened end side of the slit S, an upper side of the comb tooth, and both sides of the communication opening portion 57. A reference sign θ denotes an angle formed between the X direction and an oblique side of a trapezoid of the comb teeth (Ka, Kb), and it corresponds to an angle of an oblique side of the slit S.

Figures 24, 25:
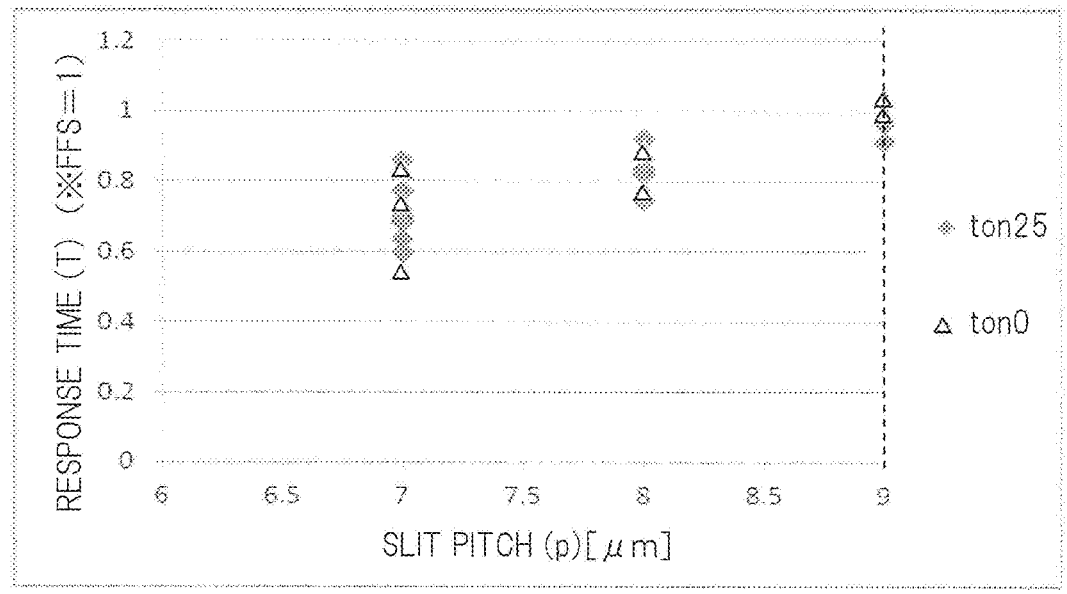
FIG. 24 is a graph showing the simulation result regarding the second characteristic (slit pitch)
FIG. 25 is a table showing the simulation result regarding the third characteristic (comb tooth angle)

FIG. 24 shows a graph of a response speed characteristic of the simulation result regarding the slit pitch (p). FIG. 24 shows a response time (T) with respect to the pitch (p). A point (ton25) of a rhombus (♦) denotes a response time (second) at a voltage ON time (OFF state→ON state) at a temperature of 25° C., and a point (ton0) of a triangle (Δ) denotes a response time (second) at a voltage ON time (OFF state→ON state) at a temperature of 0° C. FSS=1 means that a response time of a conventional FFS system is assumed to 1. From this result, it is understood that when slit pitch (p) becomes longer, the response speed becomes slow. Therefore, as a condition of improving the responsiveness compared with the conventional FFS system, p<9 μm is obtained.

[Characteristic (3)—Angle of Comb Tooth]

The characteristics of the angle θ of a comb tooth (trapezoid) in the shape shown in FIG. 23 or the like will be described with reference to FIG. 25. FIG. 25 shows a table of the result of the simulation regarding the shape of a comb tooth. The orientation stability is determined with the respective combinations of the slit length L2 of the right-side slit Sb and the angle θ. Note that, as the orientation stability, the quality (uniformity) of the luminance distribution on display (planar view) is determined. Double circle denotes a stable state, x denotes an unstable state, and triangle (Δ) denotes a fluctuating state between the stable state and the unstable state. From this experimental result, it has been understood that there is a relationship between the angle θ and the orientation stability. More specifically, the characteristics of the orientation shown in FIG. 5, FIG. 6, and the like (characteristic that rotation directions of liquid crystal molecules coincide with each other on a line and the like) are influenced by the angle θ. The condition of the angle θ is set to θ>0.5° based on the result of the stable state (double circle).

Even in the case where the rubbing direction (Rub) slightly deviates from the X direction (0°) due to a manufacturing error of the liquid crystal panel 1, the deviation can be allowed by the inclination (angle θ) of the trapezoid of the comb tooth, so that the orientation stability can be maintained.

[Characteristic (4)—Longitudinal Slit Width]

Figure 26:
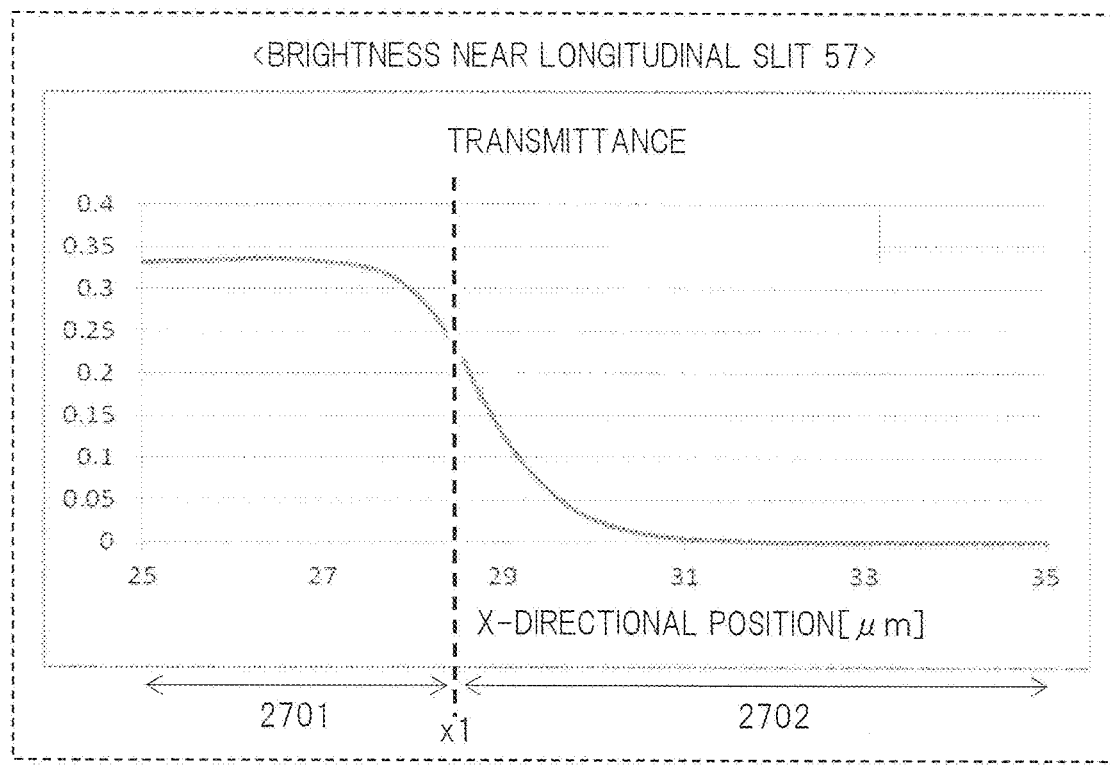
FIG. 26 is a graph showing the simulation result regarding the fourth characteristic (longitudinal slit width)

The characteristic of the width W of the longitudinal slit (communication opening portion) 57 in the shape shown in FIG. 23 or the like will be described with reference to FIG. 26. FIG. 26 shows a graph of the simulation result (brightness near the longitudinal slit 57) regarding the width W of the longitudinal slit 57. This is a graph corresponding to the distribution shown in FIG. 21 and the A-A' line in FIG. 23. A line of x1 corresponds to the line of the end portions of the left-side slit (Sa) and the comb tooth (Kb) on the opened side shown in FIG. 23. A reference numeral 2701 denotes a region of a comb tooth (Kb) positioned on the left side of x1, and a reference numeral 2702 denotes a region of the longitudinal slit 57 (width W) positioned on the right side of x1. The brightness (transmittance) in the region 2702 comes close to 0 (black) from around the line x1. For example, the brightness becomes almost zero at the position of 3.5 μm or more from x1 to the right. Therefore, a shorter width W is preferable. From this result, the condition of the width W of the longitudinal slit 57 is, for example, W≤7 μm, and particularly, W≤4 μm is preferable.

Note that the configuration in which the width W of the longitudinal slit 57 satisfies W≤0 can also be adopted. More specifically, in the case of W=0, distal ends of a plurality of comb teeth (projecting portions) align in the Y direction in the opening portion 50A, and the distal ends are separated from each other via clearances in the Y direction and a plurality of slits S are opened to communicate with each other. Further, in the case of W≤0, distal ends of a plurality of respective comb teeth (projecting portions) enter adjacent slits S in the X direction, in other words, they enter the adjacent slits in a staggered manner.

[Characteristic (5)—Retardation]

Figure 27A:
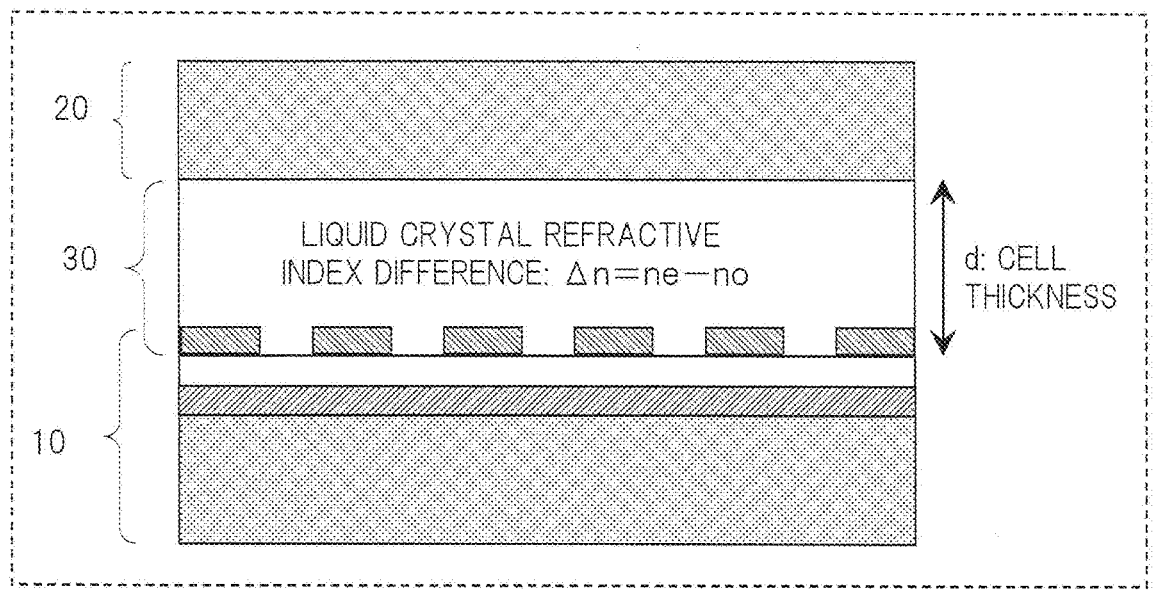
Figure 27B:
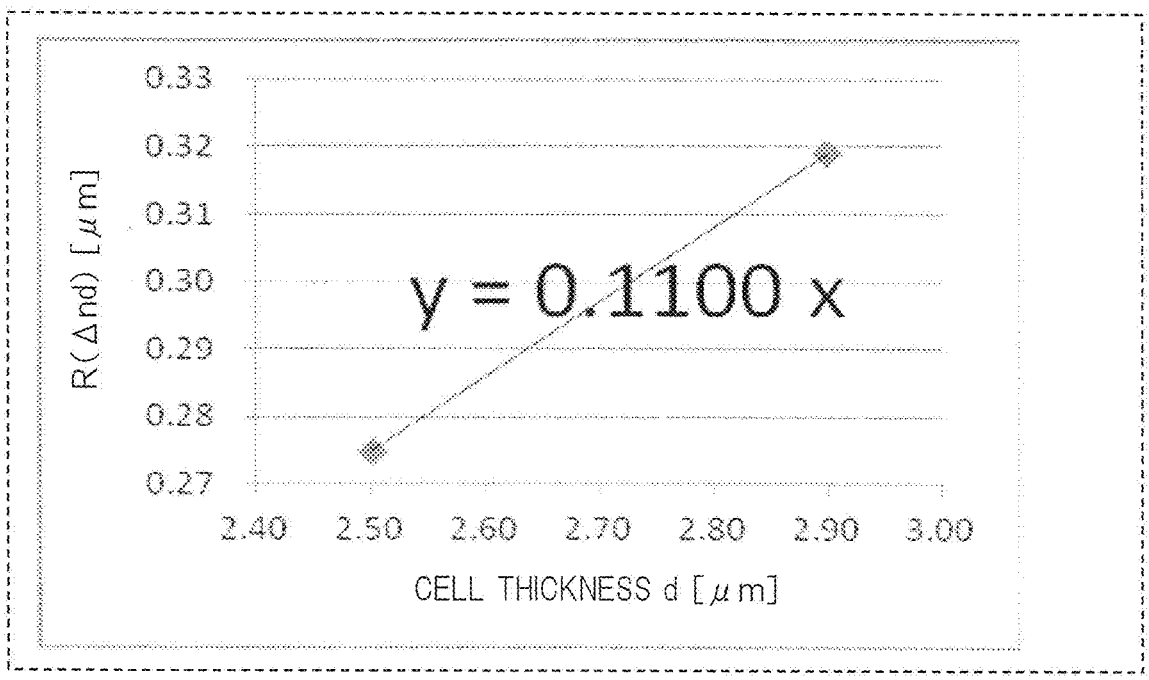
FIG. 27B is an explanatory diagram regarding the fifth characteristic (retardation R=Δnd), showing a function between the cell thickness d and the retardation R.

The characteristic of Δnd (retardation R=Δn×d) in the liquid crystal layer 30 will be described with reference to FIGS. 27A, 27B and 28. FIG. 27A shows a cell thickness d and a refractive index difference Δn regarding the retardation R (Δnd), and FIG. 27B shows a relationship between the cell thickness d and the retardation R (Δnd).

The retardation R (Δnd) represents a phase difference when light goes through the liquid crystal layer 30 having birefringence (also referred to as refractive index anisotropy). R=Δn×d is defined. The intensity of transmitted light becomes maximum at R (Δnd)=mλ (m: integer number, λ: light wavelength). A reference sign d denotes the cell thickness, and it is a length of the liquid crystal layer 30 in the Z direction as shown in FIG. 27A. A reference sign Δn denotes a refractive index difference of liquid crystal in the liquid crystal layer 30, and Δn=(ne−no). As the refractive indexes (ne, no) of nematic liquid crystal, ne is a refractive index of abnormal light (refractive index parallel to a direction of a long axis of a liquid crystal molecule) and no is a refractive index of ordinary light (refractive index perpendicular to a direction of a long axis of a liquid crystal molecule).

In this system, an optimal R (Δnd) varies in accordance with the cell thickness d unlike other many liquid crystal modes. This relationship is shown by a function: y=0.11x in the case where the cell thickness d is represented as x and R (Δnd) is represented as y.

Figure 28:
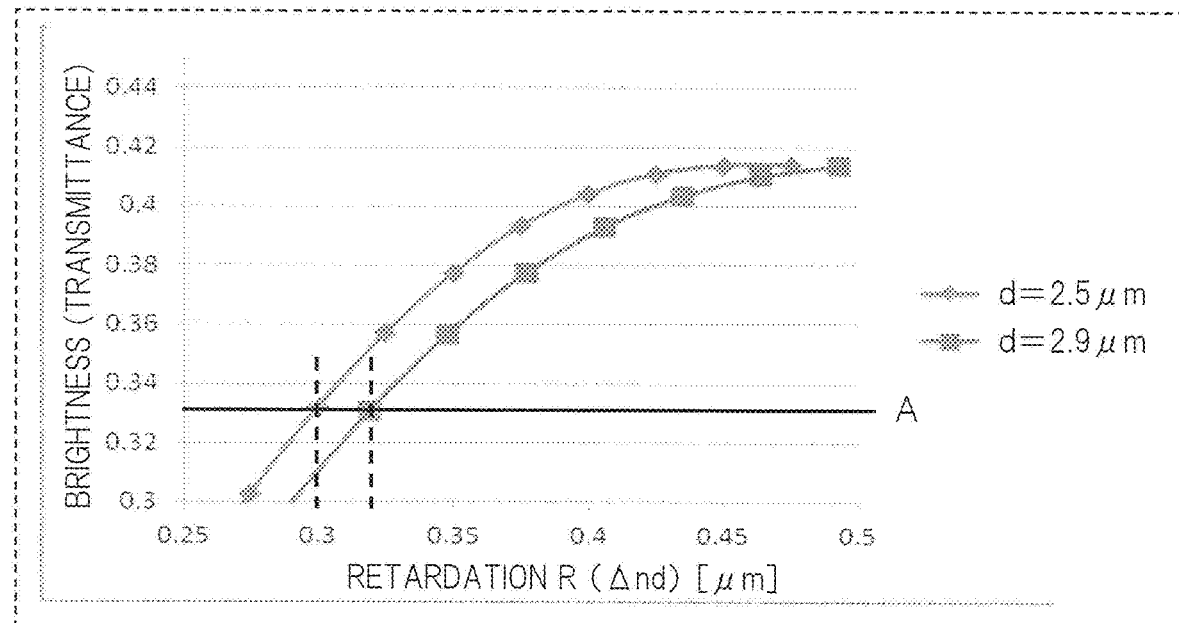
FIG. 28 is a graph showing brightness in accordance with R of the simulation result regarding the fifth characteristic.

FIG. 28 shows a graph of brightness (transmittance) in accordance with R (Δnd) as the simulation result. A point of square (■) shows the case of d=2.9 μm, and a point of a rhombus (♦) shows the case of d=2.5 μm. For example, R (Δnd) darker than the maximum transmittance is adopted in accordance with a color (CF23) of a pixel. In view of this, an R (Δnd) value equal to or more than A line where the brightness (luminance) is about 80% or higher is adopted in this system. More specifically, a preferable condition of R (Δnd) is R (Δnd)≥0.11×d. For example, in the case of d=2.5 μm, R≥0.275 μm, and in the case of d=2.9 μm, R≥0.319 μm. An of liquid crystal in the liquid crystal layer 30 and the cell thickness d are determined in accordance with the condition of R.

[Characteristic (6)—Elastic Constant]

Figure 29:
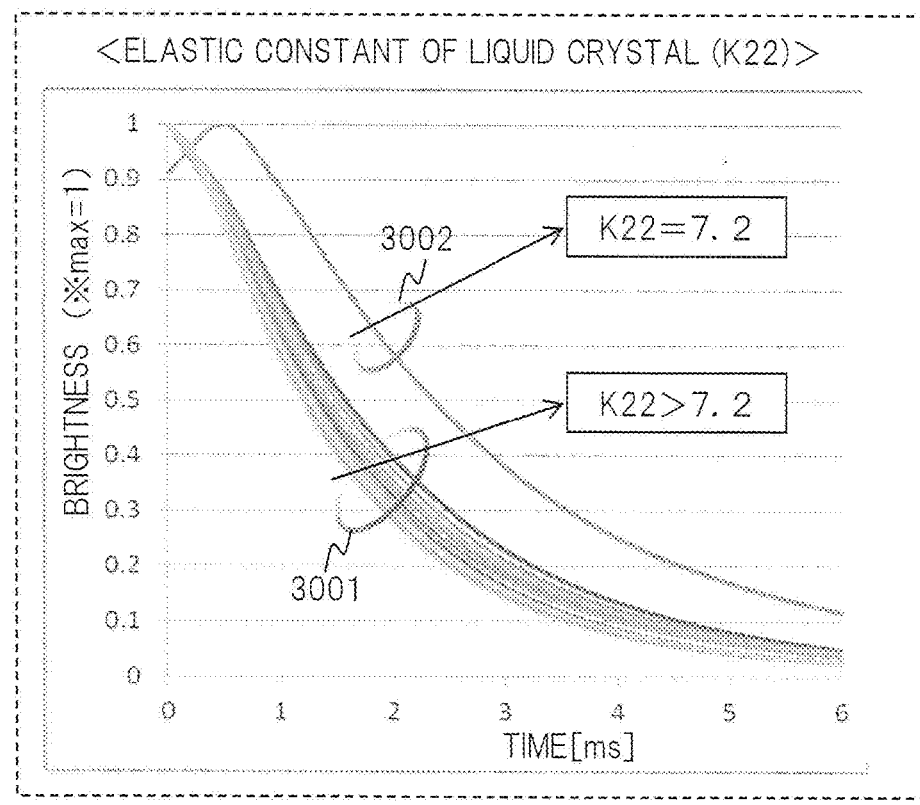
FIG. 29 is a graph of the simulation result regarding a sixth characteristic (elastic constant of liquid crystal)

The characteristic of elasticity of liquid crystal in the liquid crystal layer 30 of this system will be described with reference to FIG. 29. FIG. 29 shows a graph of a relationship between a time and brightness in accordance with the elastic constant of liquid crystal (particularly, K22) as a simulation result. As the elastic constant K of liquid crystal molecules (nematic liquid crystal) in the liquid crystal layer 30 of this system, particularly, the twist elastic constant: K22 is adopted. K22 corresponds to an elastic constant when liquid crystal molecules rotate (twist) within an X-Y plane.

FIG. 29 shows a graph of a relationship of brightness to a time (millisecond) in accordance with values of respective elastic constants K22. The time is a response time required for the change of brightness (transmittance) at the time of voltage OFF→voltage ON, in other words, a time required for the rotation of liquid crystal molecules. The brightness is standardized on the assumption that the maximum value is 1. A reference numeral 3001 denotes a curve group in the case of elastic constant K22>7.2. A reference numeral 3002 denotes a curve in the case of K22=7.2.

In this system, the high response speed is realized by actively utilizing elastic energy of liquid crystal. Particularly, rotation of liquid crystal within an X-Y plane is utilized as shown in FIG. 5, FIG. 6, and the like. Therefore, the elastic constant K (particularly, K22) should be large as much as possible in this system. In the case where the elastic constant K22 is excessively small, undesirable behavior occurs. For example, in the case of K22=7.2 as shown by the reference numeral 3002, it is understood that the response speed is slow. Therefore, in this system, K22>7.2 is adopted as a preferred condition of the elastic constant K22 from FIG. 29.

<Effects and the Like>

As described above, according to the liquid crystal display devices 100 of the respective embodiments, it is possible to provide the liquid crystal display device 100 of a new system (high-speed horizontal electric field mode) which can improve the response speed, the display quality, and the like as compared with the conventional FFS system or the like in addition to the wide viewing angle and the high aperture ratio. The response speed, the brightness, the orientation stability in pixels can be improved, and the display quality can be improved by uniformizing the pixel characteristics.

In the foregoing, the invention made by the inventor of the present invention has been concretely described based on the embodiments. However, it is needless to say that the present invention is not limited to the foregoing embodiments and various modifications and alterations can be made within the scope of the present invention. For example, regarding the shape of the opening portion 50 formed by the upper and lower electrodes (31, 32) and the like, various modified shapes described below can be adopted.

(1) Various shapes such as a rectangle, a trapezoid and a triangle may be adopted as the shapes of the slit S and the comb tooth. For example, a triangle may be adopted by setting the width w1 of an upper side of the comb tooth to 0 in FIG. 23.

(2) In the configuration α, the arrangement of the left and right slits S and comb teeth is not limited to the alternate arrangement, but an arrangement where the Y-directional positions thereof are aligned can be adopted. The shift length in the alternate arrangement is not limited to ½ of the slit pitch (p). Further, not only the X-directional lengths of the left and right slits S and comb teeth with respect to the Y-directional slit (57) and electrode portion (58), but also the Y-directional widths and pitches thereof may be changed.

(3) In the case where the X direction (for example, the extension directions of the gate line 41 and the lateral BM portion 22A) is defined as 0°, the direction of the slits S of the opening portion 50 may be slightly inclined by a certain angle (for example, 5°). Also, two or more kinds of angles may be provided as this angle and they may be caused to exist in a mixed manner in a pixel.

(4) The shape of the light-shielding lateral BM portion 22A may be changed in accordance with the shapes of the slits S and the comb teeth. For example, the width (h1) may be changed for respective pixels instead of a simple linear shape with a constant width. For example, the width (h1) may be changed in conformity with the Y-directional positions of rectangles and trapezoids of the slits S and the comb teeth of the pixels. For example, the width (side) of the lateral BM portion 22A may be changed to form a shape which coincides with an oblique side of the trapezoid of the comb tooth. Further, for example, two kinds of widths (h1) may be provided in conformity with the Y-directional positions of left and right outermost comb teeth of a pixel in the configuration α. For example, the configuration in which a width up to the position a3 is set for the right-side slit portion and a width up to the position a4 is set for the left-side slit portion in FIG. 15 may be adopted.

The present invention can be utilized for a liquid crystal display device including a liquid crystal touch panel and the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display comprising:
a first substrate;
a data line extending in a first direction on the first substrate;
a gate line extending in a second direction on the first substrate;
a first electrode arranged over the data line and the gate line;
an insulating layer on the first electrode;
a second electrode on the insulating layer including:
a connection electrode extending along the data line on the insulating layer,
and a plurality of projection electrodes connected to the connection electrode at one end of each of the projection electrodes, wherein an other end of each of the projection electrodes is separated from the data line in a plan view, and wherein each of the projection electrodes extends in parallel to the gate line in the plan view;
a second substrate facing the first substrate;
a liquid crystal layer between the first substrate and the second substrate;
wherein when a predetermined voltage is applied between the first electrode and the second electrode, liquid crystal molecules of the liquid crystal layer in neighboring regions on one side and an other side opposed to each other in a width direction of each of the projection electrodes are rotated in directions opposite to each other to be oriented, and
a black matrix on the second substrate including:
a first black matrix with a constant width in the first direction arranged over the gate line,
and a second black matrix arranged over the data line; wherein
a width of the first black matrix is wider than a width of the second black matrix,
the second black matrix overlaps the connection electrode so as to dispose the connection electrode inside of the second black matrix in the plan view.

2. The liquid crystal display according to claim 1, wherein the connection electrode includes a portion disposed inside of the data line in the plan view.

3. The liquid crystal display according to claim 1, further comprising,
a wide projection electrode connected to the connection electrode at one end of the connection electrode, wherein the first black matrix overlaps the wide projection electrode.

4. The liquid crystal display according to claim 3, wherein
a length of the connection electrode is longer than a length of the wide projection electrode and a length of each of the projection electrodes, and
a slit between the projection electrodes is open in the second direction at other ends of the projection electrodes, the other ends are overlapped with the second black matrix.

* * * * *